US012640488B2

(12) United States Patent
Wang et al.

(10) Patent No.: US 12,640,488 B2
(45) Date of Patent: May 26, 2026

(54) META-SURFACE, ANTENNA MODULE, AND ELECTRONIC DEVICE

(71) Applicants: Beijing BOE Technology Development Co., Ltd., Beijing (CN); BOE Technology Group Co., Ltd., Beijing (CN)

(72) Inventors: Feng Wang, Beijing (CN); Yidan Peng, Beijing (CN); Shuaipeng Tao, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 243 days.

(21) Appl. No.: 18/635,125

(22) Filed: Apr. 15, 2024

(65) Prior Publication Data

US 2024/0364016 A1 Oct. 31, 2024

Related U.S. Application Data

(63) Continuation of application No. PCT/CN2023/091265, filed on Apr. 27, 2023.

(51) Int. Cl.
*H01Q 15/00* (2006.01)
*H01Q 9/16* (2006.01)
*H01Q 21/24* (2006.01)

(52) U.S. Cl.
CPC ............. *H01Q 15/002* (2013.01); *H01Q 9/16* (2013.01); *H01Q 21/24* (2013.01)

(58) Field of Classification Search
CPC ......... H01Q 15/002; H01Q 9/16; H01Q 21/24
See application file for complete search history.

(56) References Cited

U.S. PATENT DOCUMENTS

2005/0264450 A1 12/2005 Nishiyama et al.
2018/0083364 A1* 3/2018 Foo .................... H01Q 15/0026
(Continued)

FOREIGN PATENT DOCUMENTS

CN 112768892 A 5/2021
CN 115566435 A 1/2023
(Continued)

OTHER PUBLICATIONS

PCT/CN2023/091265 international search report dated Jan. 3, 2024.

*Primary Examiner* — Dieu Hien T Duong
(74) *Attorney, Agent, or Firm* — IPro, PLLC

(57) ABSTRACT

Provided is a meta-surface. The meta-surface includes: a first substrate and a second substrate, and a tunable dielectric layer; wherein the first substrate includes a first dielectric substrate and a first electrode layer on a side, close to the tunable dielectric layer, of the first dielectric substrate, and the second substrate includes a second dielectric substrate and a second electrode layer on a side, close to the tunable dielectric layer, of the second dielectric substrate; wherein the first electrode layer includes a plurality of first electrode strips juxtaposed in a first direction, and the second electrode layer includes a plurality of second electrode strips juxtaposed in a second direction, wherein the plurality of first electrode strips and the plurality of second electrode strips are crossed to define a plurality of resonant units; and the meta-surface further includes a filling structure.

20 Claims, 26 Drawing Sheets

(56) References Cited

U.S. PATENT DOCUMENTS

| | | | | |
|---|---|---|---|---|
| 2023/0268661 | A1* | 8/2023 | Zhang | H01Q 21/245<br>343/702 |
| 2024/0396195 | A1* | 11/2024 | Wang | H01P 1/20 |

FOREIGN PATENT DOCUMENTS

| | | | |
|---|---|---|---|
| CN | 115603063 | A | 1/2023 |
| WO | 2016092008 | A1 | 6/2016 |

* cited by examiner

META-SURFACE, ANTENNA MODULE, AND ELECTRONIC DEVICE

CROSS-REFERENCE TO RELATED APPLICATION

This application is a continuation application of international application No. PCT/CN2023/091265, filed on Apr. 27, 2023, the disclosure of which is herein incorporated by reference in its entirety.

TECHNICAL FIELD

The present disclosure relates to the field of communication technologies, in particular to a meta-surface, an antenna module, and an electronic device.

BACKGROUND

With rapid development of mobile communication and increasingly complex communication environments, digital meta-surface and reconfigurable meta-surface have received more and more attention of researchers in the wireless communication technology field, and smart reconfigurable meta-surface technologies having the commercial application value have been developed in recent years.

SUMMARY

Some embodiments of the present disclosure provide a meta-surface. The meta-surface includes: a first substrate, a second substrate, and a tunable dielectric layer between the first substrate and the second substrate; wherein the first substrate includes a first dielectric substrate and a first electrode layer on a side, close to the tunable dielectric layer, of the first dielectric substrate, and the second substrate includes a second dielectric substrate and a second electrode layer on a side, close to the tunable dielectric layer, of the second dielectric substrate; wherein the first electrode layer includes a plurality of first electrode strips juxtaposed in a first direction, and the second electrode layer includes a plurality of second electrode strips juxtaposed in a second direction, wherein the plurality of first electrode strips and the plurality of second electrode strips are crossed to define a plurality of resonant units; and the meta-surface further includes a filling structure, wherein an orthographic projection of the filling structure on the first dielectric substrate is between orthographic projections of adjacent first electrode strips in the plurality of first electrode strips on the first dielectric substrate.

In some embodiments, the first electrode layer includes the filling structure between the adjacent first electrode strips.

In some embodiments, the filling structure includes a first filling strip and a second filling strip juxtaposed in the first direction, wherein a first gap is present between the first filling strip and the second filling strip; and for the adjacent first electrode strips and the filling structure between the adjacent first electrode strips, one of the adjacent first electrode strips and the first filling strip are connected to form an integrated structure, and the other of the adjacent first electrode strips and the second filling strip are connected to form an integrated structure.

In some embodiments, a width of the first gap in the first direction is less than a width of each of the plurality of first electrode strips in the first direction.

In some embodiments, a second gap is present between the filling structure and at least one adjacent first electrode strip in the plurality of first electrode strips.

In some embodiments, a width of the second gap in the first direction is less than a width of each of the plurality of first electrode strips in the first direction.

In some embodiments, each of the plurality of second electrode strips includes a plurality of electrode portions and connection portions configured to connect two adjacent electrode portions in the plurality of electrode portions, wherein an orthographic projection of each of the plurality of electrode portions on the first dielectric substrate is overlapped with an orthographic projection of each of the plurality of first electrode strips on the first dielectric substrate.

In some embodiments, a ratio of a width of the each of the plurality of electrode portions to a width of each of the connection portions in the second direction ranges from 2.57 to 2.58.

In some embodiments, each of the plurality of resonant units further includes a first via defined in each of the plurality of first electrode strips and a second via defined in each of the plurality of second electrode strips, wherein an orthographic projection of the first via on the first dielectric substrate is intersected with an orthographic projection of the second via on the first dielectric substrate.

In some embodiments, a ratio of a width of the first via to a width of the each of the plurality of first electrode strips in the first direction ranges from 0.02 to 0.06, and a ratio of the width of the first via to a width of the each of the plurality of resonant units in the second direction ranges from 0.3 to 0.5.

In some embodiments, a ratio of a width of the second via to a width of the each of the plurality of resonant units in the first direction ranges from 0.05 to 0.85, and a ratio of the width of the second via to the width of the each of the plurality of resonant units in the second direction ranges from 0.05 to 0.15.

Some embodiments of the present disclosure provide an antenna module. The antenna module includes: at least one meta-surface in any of the above embodiments and the antenna.

In some embodiments, the antenna module includes: a plurality of meta-surfaces, wherein the antenna is disposed in a region defined by the plurality of meta-surfaces, wherein the second electrode layer is closer to the antenna than the first electrode layer.

In some embodiments, the antenna module includes: two opposite meta-surfaces in the plurality of meta-surfaces, wherein the antenna is disposed between the two opposite meta-surfaces.

In some embodiments, a distance between the antenna and each of the plurality of meta-surfaces ranges from 0.45 to 0.55 radiation wavelengths.

In some embodiments, the antenna module includes: two of the plurality of meta-surfaces, wherein extension surfaces of the two of the plurality of meta-surfaces are intersected; and the antenna is disposed in a region defined by the two of the plurality of meta-surfaces.

In some embodiments, the antenna is a dipole antenna.

In some embodiments, the antenna module includes: the plurality of meta-surfaces sequentially connected to form an annular structure, wherein the antenna is disposed in the annular structure formed by the plurality of meta-surfaces.

In some embodiments, the antenna module further includes: a drive module, configured to sequential supply incrementing bias voltages to the plurality of first electrode strips in accordance with an arrangement sequence of the plurality of first electrode strips, such that a scanning range of a beam formed by the antenna module is offset by +12° in a direction perpendicular to a normal of the meta-surface.

Some embodiments of the present disclosure further provide an electronic device. The electronic device includes the antenna array in any of the above embodiments.

Figure 1A:
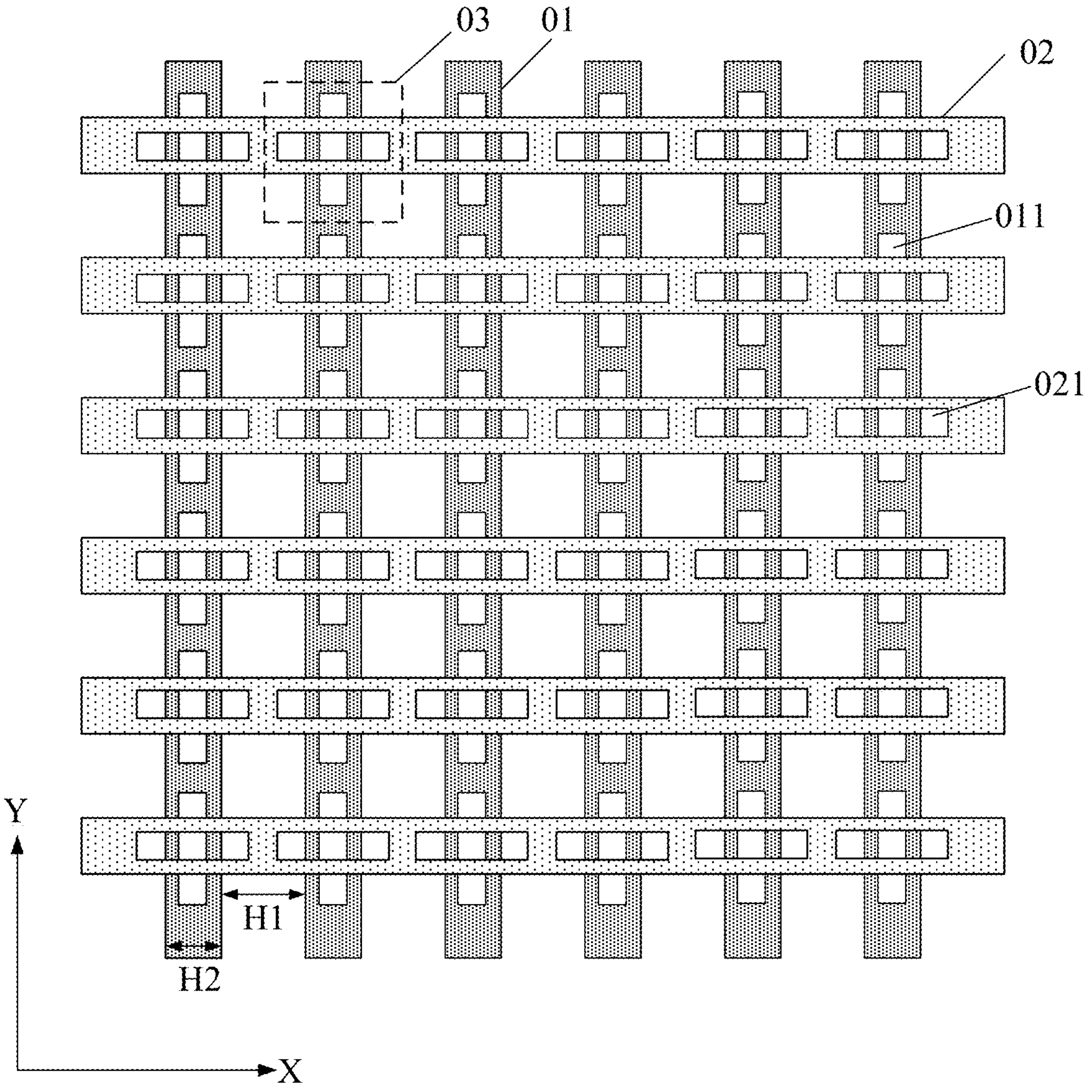
FIG. 1*a* is a schematic diagram of a crossbar structure of a traditional meta-surface.

Reference numerals and denotations thereof: X-first direction; Y-second direction; 101—first electrode layer; 102—second electrode layer; 1—first electrode strip; 2—second electrode strip; 3—resonant unit; 4—filling structure; 41—first filling strip; 42—second filling strip; 43—first gap; 44—second gap; 21—electrode portion; 22—connection portion; 11—first via; 23—second via; 10—first dielectric substrate; 20—second dielectric substrate; 30—tunable dielectric layer; 00—meta-surface; 40—antenna; 401—third dielectric substrate; 402—radiation electrode; 403—reference electrode; 4031—third via; 4032—fourth via; 404—transmission line; 451—first reference sub-electrode; 452—second reference sub-electrode; 4041—first transmission portion; 4042—second transmission portion; 50—structure support; 60—wave-absorbing structure.

DETAILED DESCRIPTION

For clearer descriptions of the objects, technical solutions, and advantages of the embodiments of present disclosure, the present disclosure is described in detail hereinafter in combination with the accompanying drawings and the specific embodiments of the present disclosure. It is obvious that the described embodiments are merely part but not all of the embodiments of the present disclosure. Generally, assemblies of the embodiments of the present disclosure described and shown in the accompanying drawings herein can be arranged and designed in various configurations. Thus, detailed descriptions of the embodiments of the present disclosure in the accompanying drawings hereinafter are not intended to limit the claimed protection scope, and only represent the specific embodiments of the present disclosure. All other embodiments derived by those skilled in the art without creative efforts based on the embodiments in the present disclosure are within the protection scope of the disclosure.

Unless otherwise defined, technical or scientific terms used in the present disclosure shall have ordinary meaning understood by persons of ordinary skill in the art to which the disclosure belongs. The terms "first," "second," and the like used in the embodiments of the present disclosure are not intended to indicate any order, quantity or importance, but are merely used to distinguish the different components. The terms "a," "an," and the like are not intended to limit the quantity, and only represent that at least one exists. The terms "comprise" or "include" and the like are used to indicate that the element or object preceding the terms covers the element or object following the terms and its equivalents, and shall not be understood as excluding other elements or objects. The terms "connect" or "contact" and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

The term "a plurality of or several" herein means two or more. The term "and/or" describes associations between associated objects, and indicates three types of relationships. For example, "A and/or B" indicates that A alone, A and B, or B alone. The character "/" generally indicates that the associated objects are in an "or" relationship.

In some practices, a reconfigurable meta-surface based on a simplified drive circuit is composed of multiple resonant unit arrays in series. This meta-surface is similar to a passive matrix drive structure in early liquid crystal displays, and is referred to as the crossbar structure. However, due to the limitation of the layout of the electrode strips in the metal gate, the insertion loss (S21) of the traditional crossbar structure is generally great, and thus the traditional crossbar structure does not meet requirements of the increasingly developed high-gain antennas. FIG. 1*a* is a schematic diagram of a crossbar structure of a traditional meta-surface. As shown in FIG. 1*a*, the crossbar structure includes a gate structure having two upper and lower metal layers and a liquid crystal layer between the two upper and lower metal layers. The lower metal layer includes a plurality of first electrode strips 01 juxtaposed in a first direction X, and the upper metal layer includes a plurality of second electrode strips 02 juxtaposed in a second direction Y. A first gap is present between two adjacent first electrode strips 01, and a width H1 of the first gap is greater than a width H2 of the first electrode strip 01. The plurality of first electrode strips 01 and the plurality of second electrode strips 02 are crossed to define a plurality of resonant units 03. The resonant unit 03 further includes a first via 011 defined in the first electrode strip 01 and a second via 021 defined in the second electrode strip 02. An orthographic projection of the first via 011 is intersected with an orthographic projection of the second via 021. A width of the first via 011 in the first direction X is equal to a width of the second via 021 in the second direction Y.

Figure 1B:
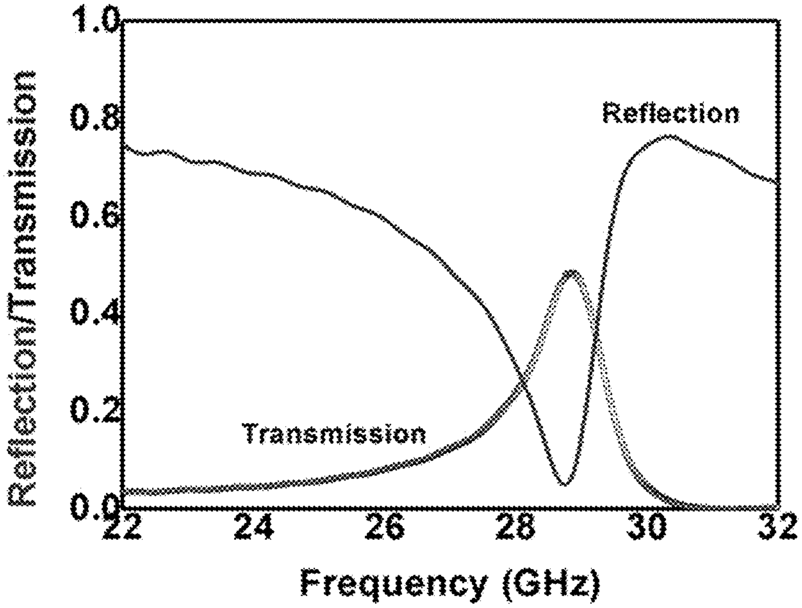
FIG. 1*b* is a schematic diagram of a transmission (S21) curve and reflection (S11) curve of the structure in FIG. 1*a* operating at different communication frequencies.
Figure 1C:
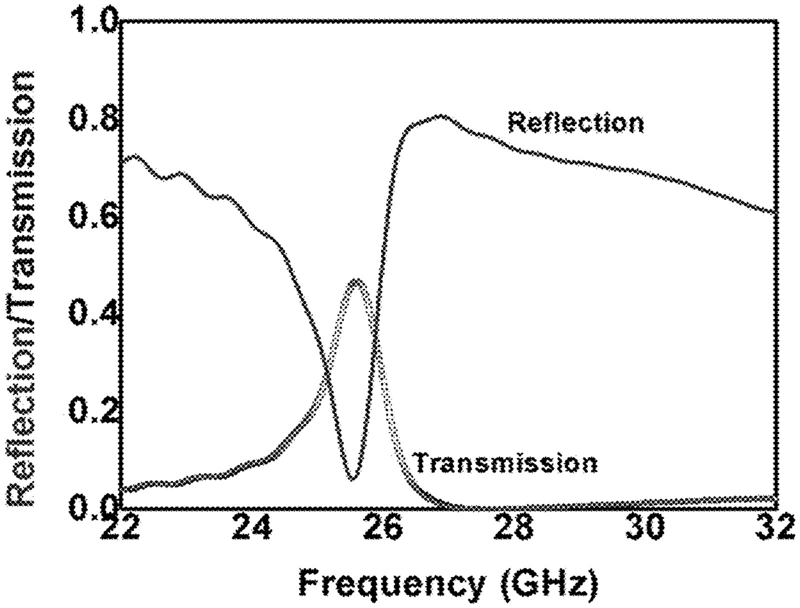
FIG. 1*c* is a schematic diagram of a transmission (S21) curve and a reflection (S11) curve of the structure in FIG. 1*a* operating at different communication frequencies.

In this case, a liquid crystal dielectric constant of the liquid crystal layer $\varepsilon\|=3.582$ ($\tan\delta=0.006$), and $\varepsilon\perp=2.453$ ($\tan\delta=0.011$). The transmission (S21) and the reflection (S11) of the crossbar structure are detected in the case that the crossbar structure operates at 20 GHZ. As shown in FIG. 1*b* and FIG. 1*c*, FIG. 1*b* is a schematic diagram of a transmission (S21) curve and reflection (S11) curve of the structure in FIG. 1*a* operating at different communication frequencies. As shown in FIG. 1*b*, in the case that the voltage is not supplied on the crossbar structure, the transmission (S21) is highest at the frequency of 28.7 GHZ, that is, 47%; and the reflection (S11) is lowest at the frequency of 28.7 GHZ, that is, 4%. FIG. 1*c* is a schematic diagram of a transmission (S21) curve and a reflection (S11) curve of the structure in FIG. 1*a* operating at different communication frequencies. As shown in FIG. 1*c*, in the case that a saturation voltage of 6 V is supplied on the crossbar structure, the transmission (S21) is lowest at the frequency of 25.7 GHz, that is, 45%; and the reflection (S11) is highest at the frequency of 27 GHZ, that is, 80%. It can be seen that the transmission and the reflection of the crossbar structure in FIG. 1*a* are less, and thus the antenna with high gain is not achieved by the crossbar structure in FIG. 1*a*.

Thus, the embodiments of the present disclosure provide a meta-surface. A filling structure is added to increase a radiation area of an outermost side of the traditional meta-surface in a millimeter wave radiation direction, such that the insertion loss (S21) is reduced to improve the transmission of the millimeter wave in the transmission operation mode, and the reflection of the millimeter wave is improved in the reflection operation mode. Thus, the radiation gain of the antenna module including the meta-surface is further improved.

In a first aspect, the embodiments of the present disclosure provide a meta-surface. The meta-surface includes a first substrate and a second substrate, and a tunable dielectric layer 30 between the first substrate and the second substrate. The first substrate includes a first dielectric substrate 10 and a first electrode layer 101 on a side, close to the tunable dielectric layer 30, of the first dielectric substrate 10, and the second substrate includes a second dielectric substrate 20 and a second electrode layer 102 on a side, close to the tunable dielectric layer 30, of the second dielectric substrate 20. The first electrode layer 101 includes a plurality of first electrode strips 1 juxtaposed in a first direction X, and the second electrode layer 102 includes a plurality of second electrode strips 2 juxtaposed in a second direction Y. The plurality of first electrode strips 1 and the plurality of second electrode strips 2 are crossed to define a plurality of resonant units 3. The meta-surface further includes a filling structure 4. An orthographic projection of the filling structure 4 on the first dielectric substrate 10 is between orthographic projections of adjacent first electrode strips 1 on the first dielectric substrate 10.

In the embodiments of the present disclosure, the first substrate and the second substrate in the meta-surface are opposite, or extension surfaces of the first substrate and the second substrate are intersected. The embodiments of the present disclosure are illustrated by taking the first substrate and the second substrate in the meta-surface being opposite as an example.

Illustratively, the filling structure 4 is disposed between the first electrode layer 101 and the second electrode layer 102, and the orthographic projection of the filling structure 4 on the first dielectric substrate 10 is between the orthographic projections of the adjacent first electrode strips 1 on the first dielectric substrate 10.

Illustratively, the first electrode layer 101 includes the filling structure 4 between the adjacent first electrode strips 1.

The following embodiments are illustrated by taking the first electrode layer 101 including the first electrode strip 1 and the filling structure 4 as an example.

In the case that the meta-surface is applicable to the antenna module, the first electrode layer 101 is farther to the antenna 40 than the second electrode layer 102, and the millimeter wave radiated by the antenna 40 is transmitted by successively passing through the second electrode layer 102 and the first electrode layer 101. As the filling structure 4 is disposed, compared with some practices (a first gap is present between two adjacent first electrode strips 1, and a width of the first gap is greater than a width of the first electrode strip 1), the distance between two adjacent first electrode strips 1 is shortened in the embodiments, such that the capacitance is increased, and the transmission is improved in the transmission operation mode. In the reflection mode, the millimeter wave radiated by the antenna 40 is reflected by the first electrode layer 101 upon passing through the second electrode layer 102. As the filling structure 4 is disposed, compared with some practices (a first gap is present between two adjacent first electrode strips 1, and a width of the first gap is greater than a width of the first electrode strip 1), a reflection area of the first electrode layer 101 is increased, and the reflection is increased.

In addition, the meta-surface in the embodiments of the present disclosure is acquired by improving the crossbar structure. The reconfiguration of the meta-surface using the passive matrix-driven structure (the crossbar structure) has the two following advantages. At first, the meta-surface includes a large amount of deep subwavelength units (that is, the resonant units 3), such that the device with reconfigurable resonant units 3 is flexibly achieved in a corresponding frequency in the meta-surface. A size of the resonant unit 3 is significant for controlling the beam, different sizes of the resonant units 3 achieve diffraction for the electromagnetic wave at different angles, and the resonant unit 3 with nonuniform sizes are used to cause enhanced scattering of the electromagnetic wave in a specific direction. Secondly, as the passive matrix-drive is used, a number of control lines required by the meta-surface including a large amount of deep subwavelength units is less, such that the control lines and control ports are greatly saved, the device with a large aperture is facilitated to be achieved, and the difficult arrangement of the lines under the premise of setting a large number of resonant units 3 is alleviated.

Figure 2A:
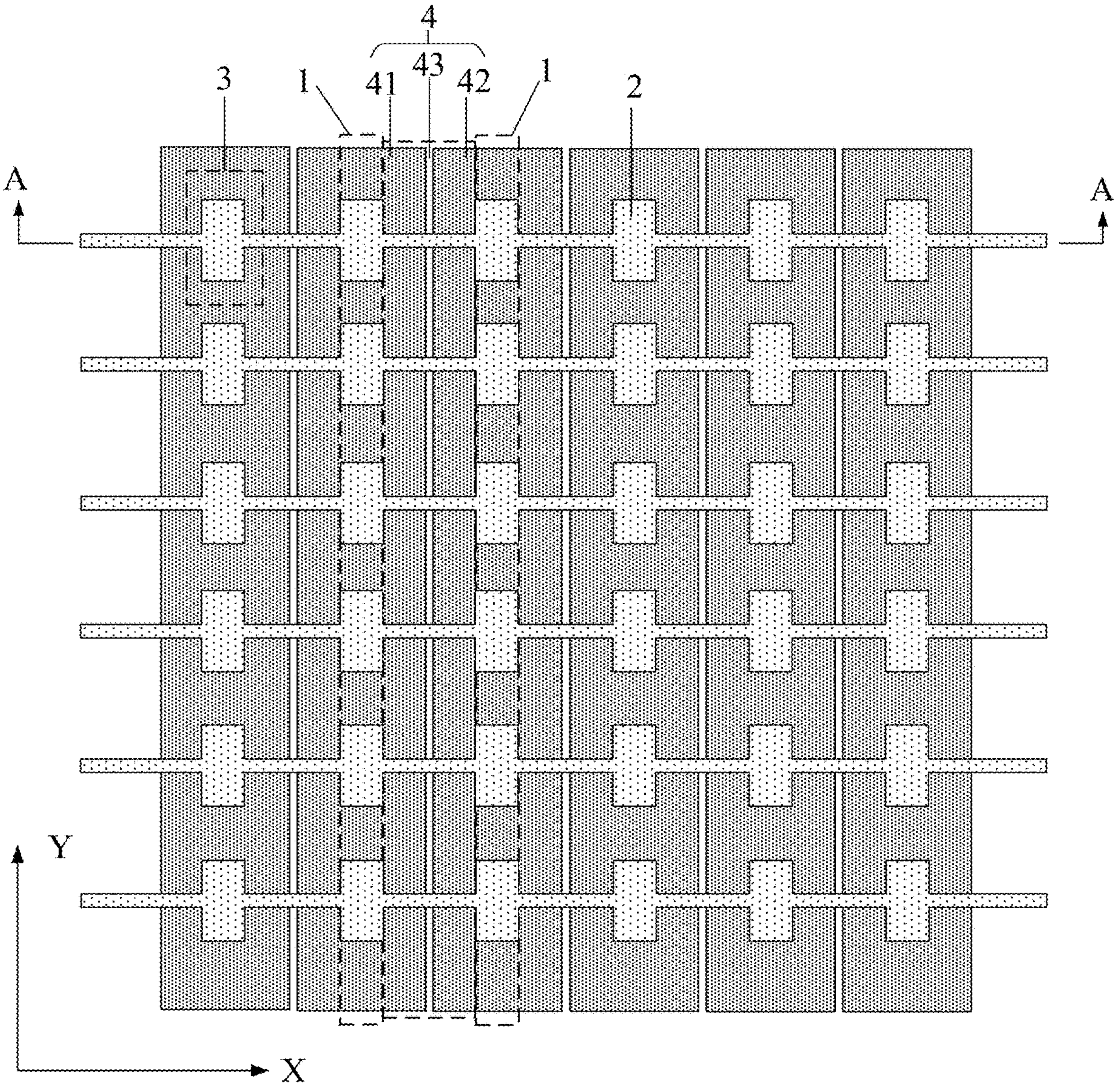
FIG. 2*a* is a schematic diagram of a meta-surface array according to some embodiments of the present disclosure.
Figure 2B:
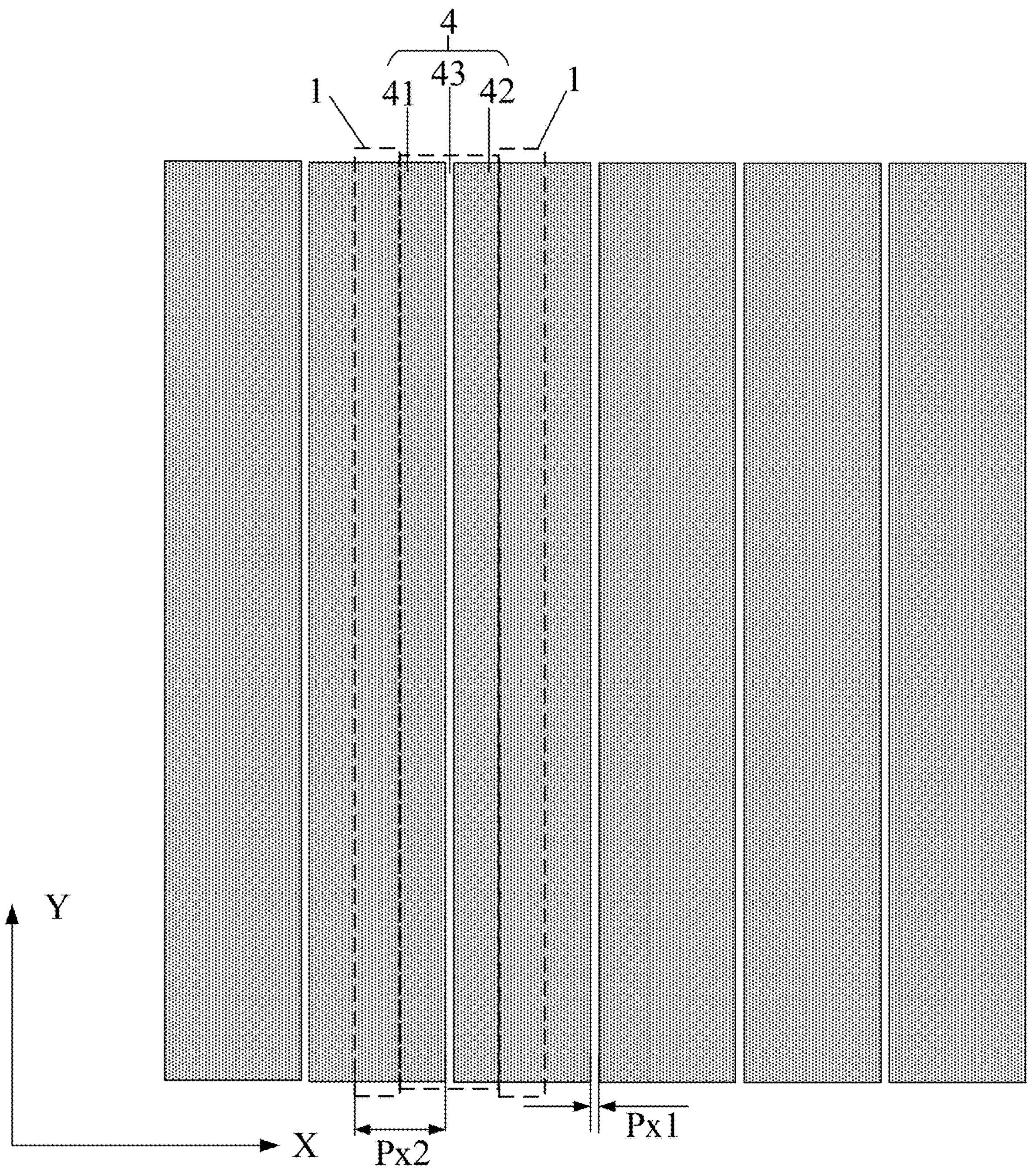
FIG. 2*b* is a schematic diagram of a first electrode layer in FIG. 2*a;*

In some embodiments, FIG. 2*a* is a schematic diagram of a meta-surface array according to some embodiments of the present disclosure. FIG. 2*b* is a schematic diagram of a first electrode layer 101 in FIG. 2*a*. As shown in FIG. 2*a* and FIG. 2*b*, the first electrode layer 101 includes the filling structure 4 between the adjacent first electrode strips 1. The filling structure 4 includes a first filling strip 42 and a second filling strip 42 juxtaposed in the first direction X. A first gap 43 is present between the first filling strip 41 and the second filling strip 42. For the adjacent first electrode strips 1 and the filling structure 4 between the adjacent first electrode strips 1, one of the adjacent first electrode strips 1 and the first filling strip 41 are connected to form an integrated structure, and the other of the adjacent first electrode strips 1 and the second filling strip 42 are connected to form an integrated structure.

In the embodiments, the width of the first electrode strip 1 is increased in the first direction X on the basis of FIG. 1, and the first electrode strip 1 and the first filling strip 41 that are juxtaposed in the first direction X and are connected to form an integrated structure are formed, such that an overall layer coverage area of the layer of the first electrode layer 101 in the meta-surface is increased, and the transmission and the reflection of the meta-surface in operating are simultaneously improved.

Furthermore, as shown in FIG. 2*b*, a width Px1 of the first gap 43 in the first direction X is less than a width Px2 of the first electrode strip 1 and the first filling strip 41 in the first direction X. By disposing the filling structure 4, the first gap 43 as narrow as possible is set to improve the transmission and the reflection. Illustratively, a size of the first gap 43 in the first direction X ranges from 0 to 0.1 mm (not including 0). For example, the size of the first gap 43 in the first direction X ranges from 20 μm to 50 μm in the case that the process preparation conditions permit.

Figure 3:
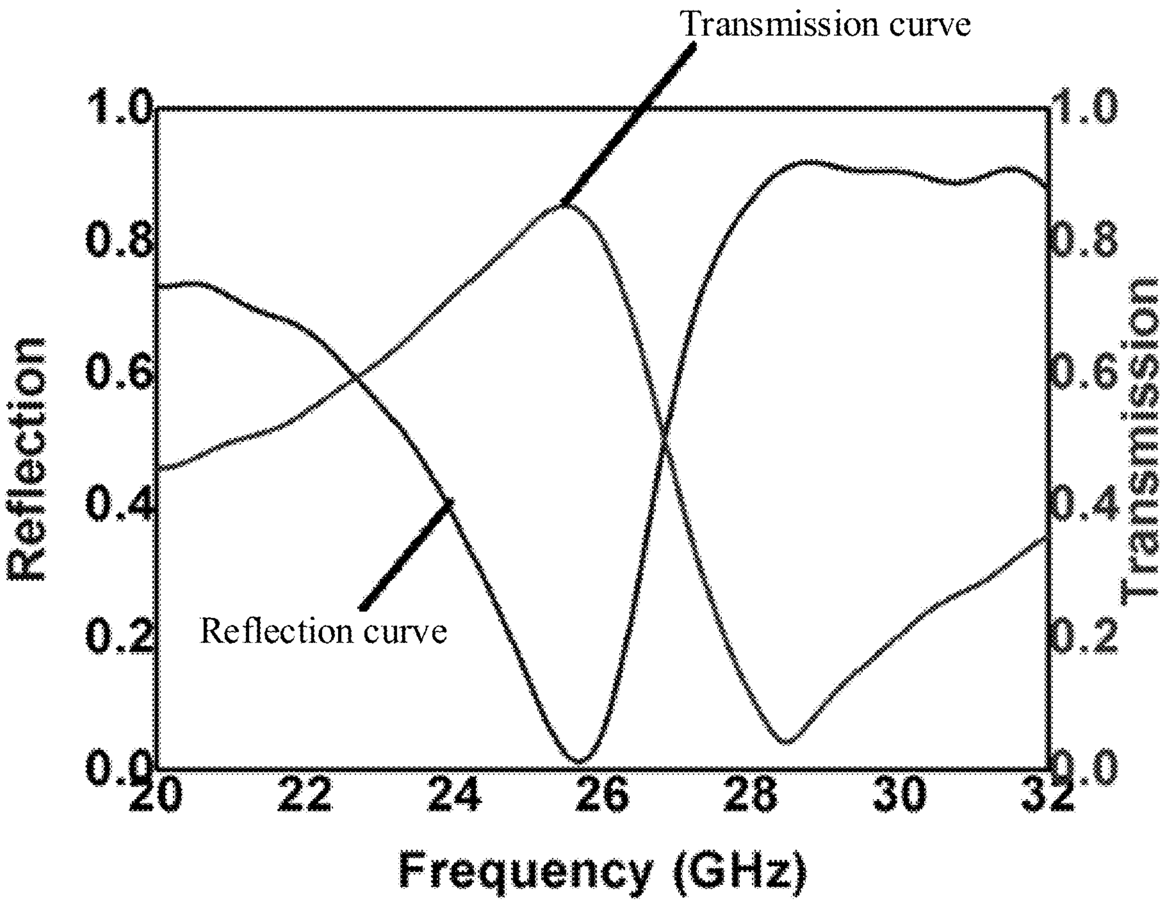
FIG. 3 is a schematic diagram of a transmission (S21) curve and reflection (S11) curve of the structure in FIG. 2*a* operating at different communication frequencies.

FIG. 3 is a schematic diagram of a transmission (S21) curve and reflection (S11) curve of the structure in FIG. 2*a* operating at different communication frequencies. As shown in FIG. 3, in the case that the voltage is not supplied on the meta-surface, the transmission (S21) is highest at the frequency of 25.8 GHZ, that is, 87%; and the reflection (S11) is lowest and is close to 0. In this case, the meta-surface operates in the transmission mode. Compared with the result indicated in FIG. 1*b*, the filling structure 4 is added in the embodiments, such that the transmission of the meta-surface is improved, and the radiation gain of the antenna module including the meta-surface is further improved.

Figure 4:
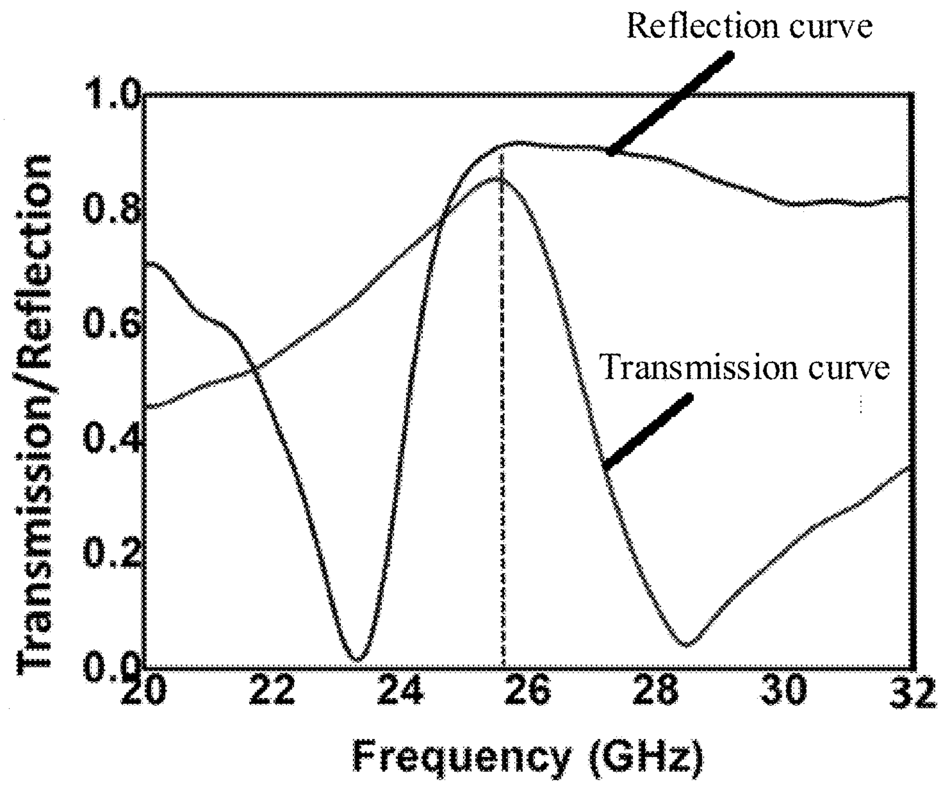
FIG. 4 is a schematic diagram of a transmission (S21) curve and a reflection (S11) curve of the structure in FIG. 2*a* operating at different communication frequencies.

FIG. 4 is a schematic diagram of a transmission (S21) curve and a reflection (S11) curve of the structure in FIG. 2*a* operating at different communication frequencies. As shown in FIG. 4, in the case that a saturation voltage of 6 V is supplied on the meta-surface, the reflection (S11) is highest at the frequency of 25.8 GHZ, that is, 91%. In this case, the meta-surface operates in the reflection mode. Compared with the result indicated in FIG. 1*c*, the filling structure 4 is added in the embodiments, such that the reflection of the meta-surface is improved, and the radiation gain of the dual-beam and multi-beam of the antenna module including the meta-surface is further improved.

In addition to the meta-surface array structure shown in FIG. 2*a*, any design with the high transmission in a specific frequency and the high reflection in the adjacent frequency is desirable. For example, in FIG. 5*a*, the position of the transmission seam (the first gap 43) of the crossbar changes, the changed structure also shows the desired transmission curve and reflection curve, and thus the designed structure in FIG. 5*a* can be used to achieve the configuration of the multi-beam switch scan system.

Figure 5A:
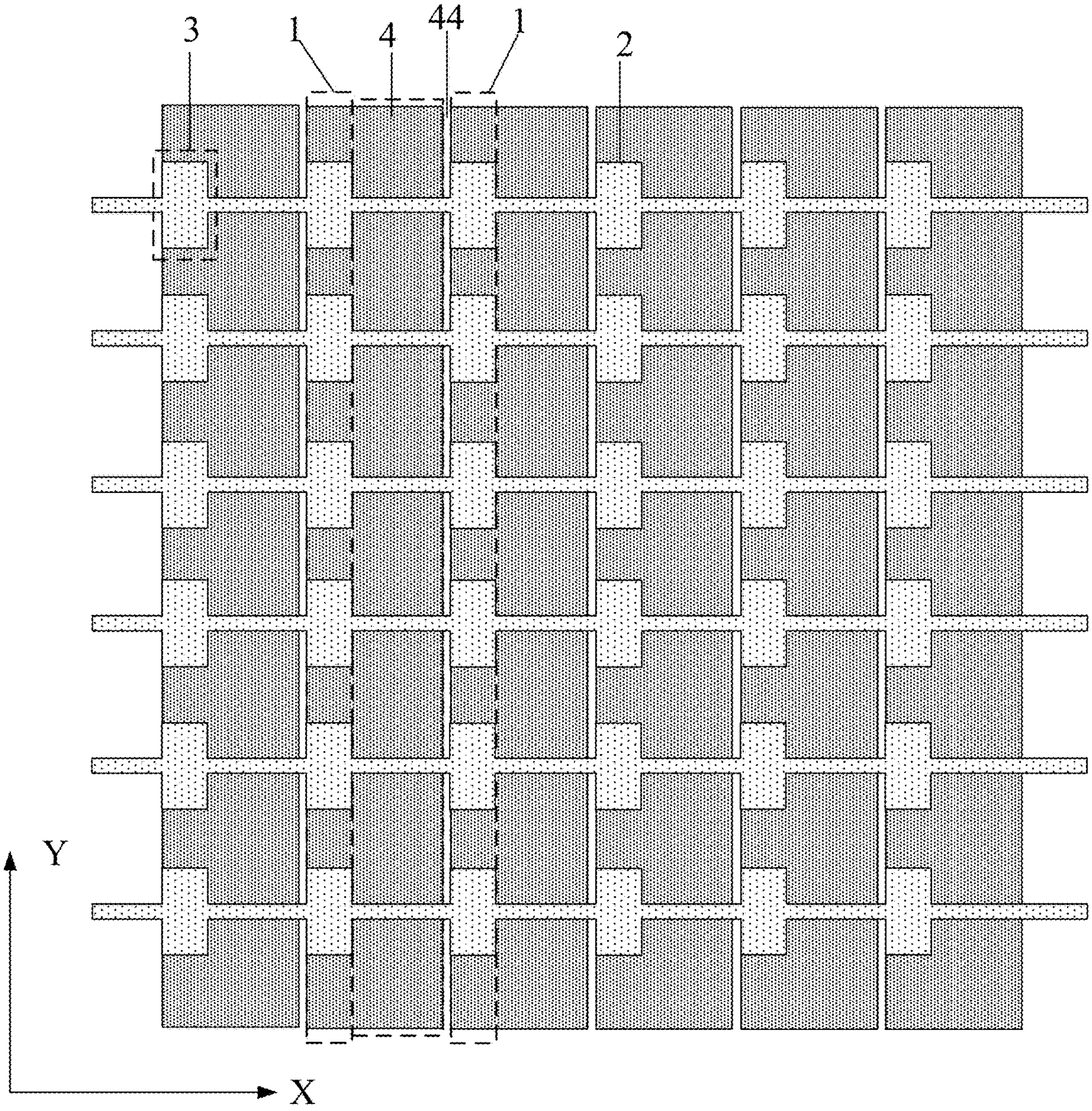
FIG. 5*a* is a schematic diagram of a meta-surface array according to some embodiments of the present disclosure.
Figure 5B:
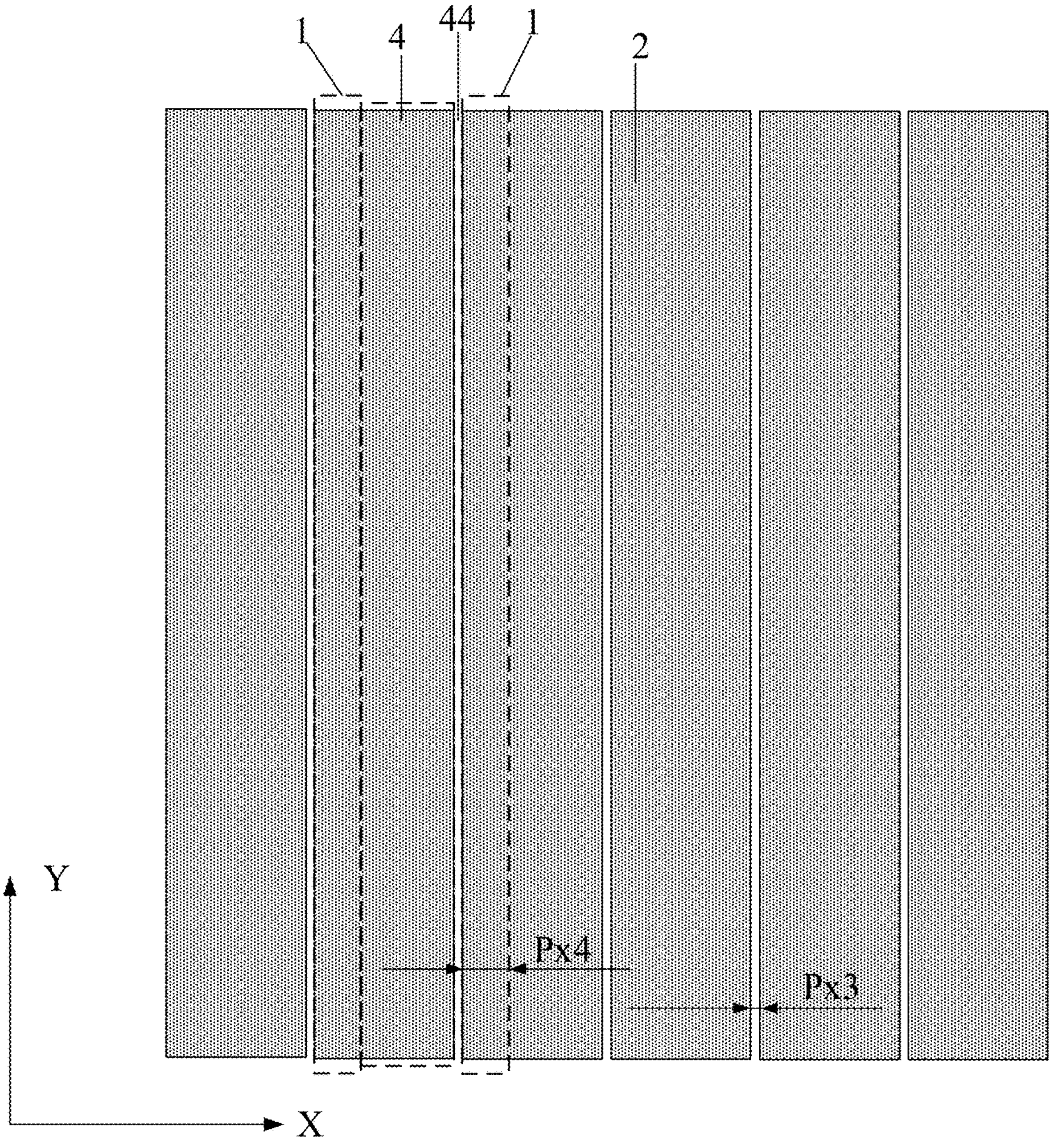
FIG. 5*b* is a schematic diagram of a first electrode layer in FIG. 5*a;*
Figure 6A:
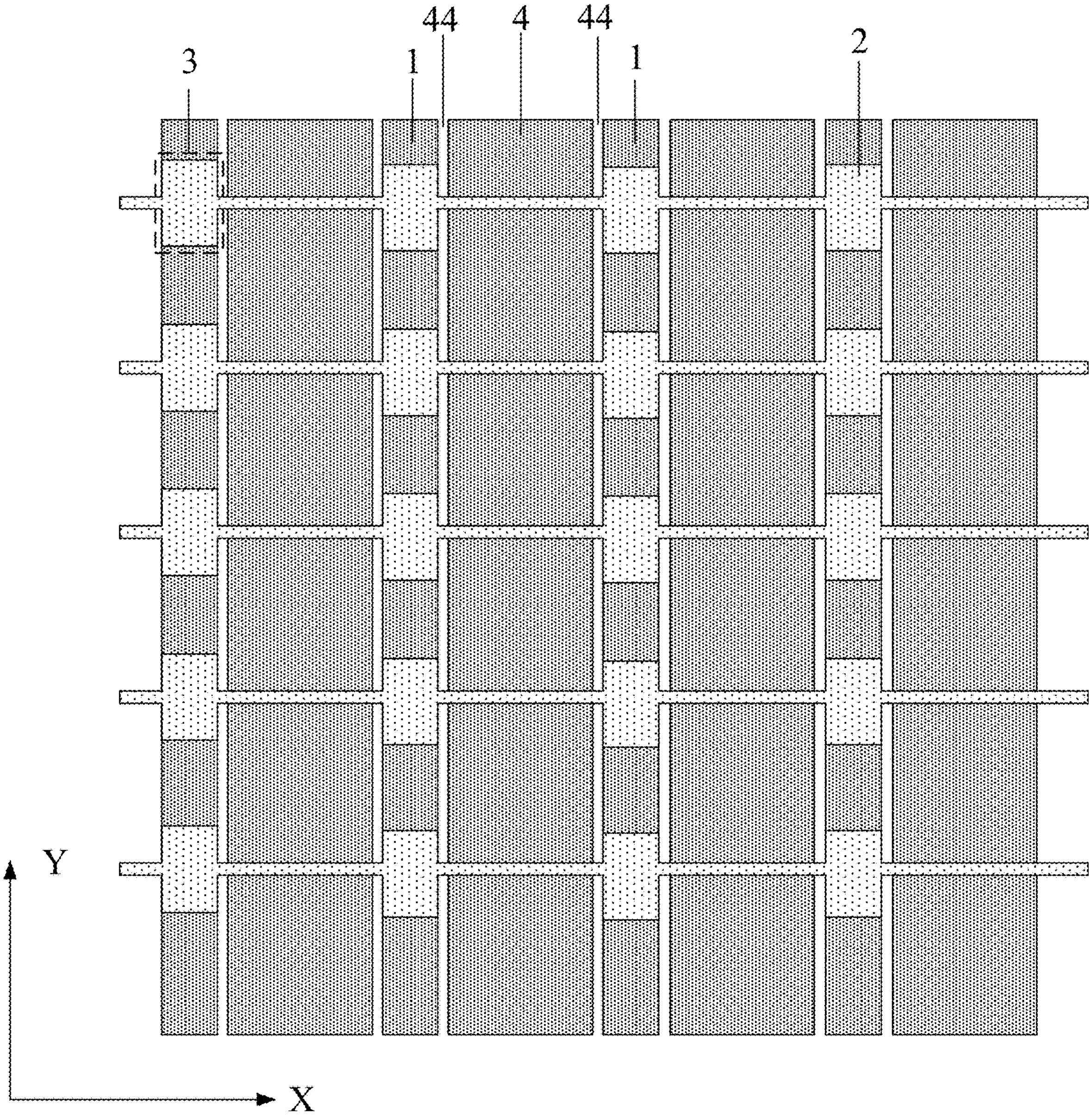
FIG. 6*a* is a schematic diagram of a meta-surface array according to some embodiments of the present disclosure.
Figure 6B:
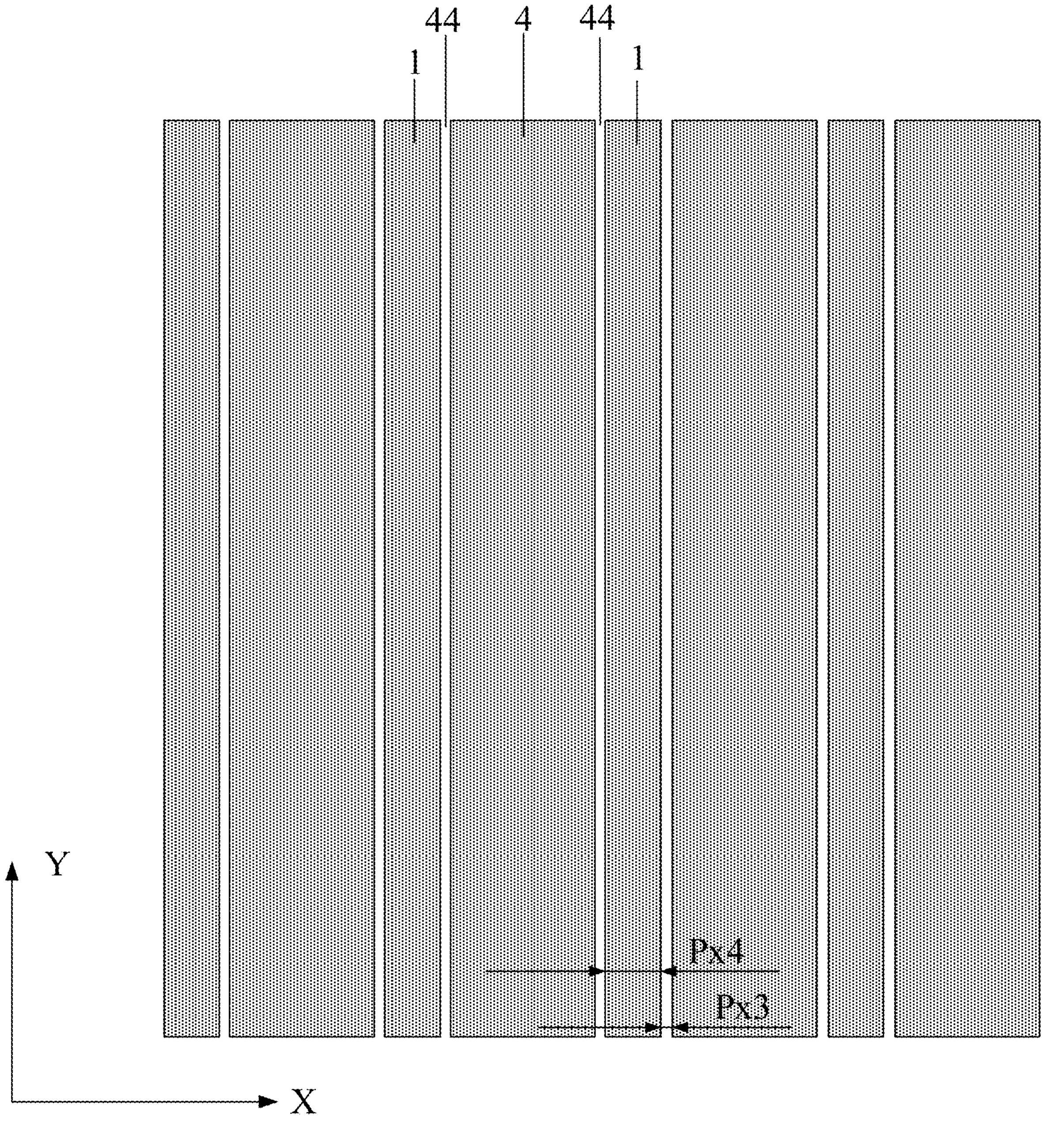
FIG. 6*b* is a schematic diagram of a first electrode layer in FIG. 6*a;*

In some embodiments, FIG. 5*a* is a schematic diagram of a meta-surface array according to some embodiments of the present disclosure, FIG. 5*b* is a schematic diagram of a first electrode layer in FIG. 5*a*, FIG. 6*a* is a schematic diagram of a meta-surface array according to some embodiments of the present disclosure, and FIG. 6*b* is a schematic diagram of a first electrode layer in FIG. 6*a*. As shown in FIG. 5*a*, FIG. 5*b*, FIG. 6*a*, and FIG. 6*b*, a second gap 44 is present between the filling structure 4 and at least one adjacent first electrode strip 1.

Illustratively, as shown in FIG. 5*a* and FIG. 5*b*, the second gap 44 is present between the filling structure 4 and one adjacent first electrode strip 1, and the filling structure 4 and the other adjacent first electrode strip 1 are connected to form an integrated structure.

Illustratively, as shown in FIG. 6*a* and FIG. 6*b*, the second gap 44 is respectively present between the filling structure 4 and two adjacent first electrode strips 1.

Furthermore, as shown in FIG. 5*b* or FIG. 6*b*, a width Px3 of the second gap 44 in the first direction X is less than a width Px4 of the first electrode strip 1 in the first direction X. The transmission and the reflection are improved by disposing the filling structure 4 and the first gap 43 as narrow as possible. Illustratively, the size of the first gap 43 in the first direction X ranges from 0 to 0.1 mm (not including 0). For example, the size of the first gap 43 in the first direction X ranges from 20 μm to 50 μm in the case that the process preparation conditions permit.

Figure 7:
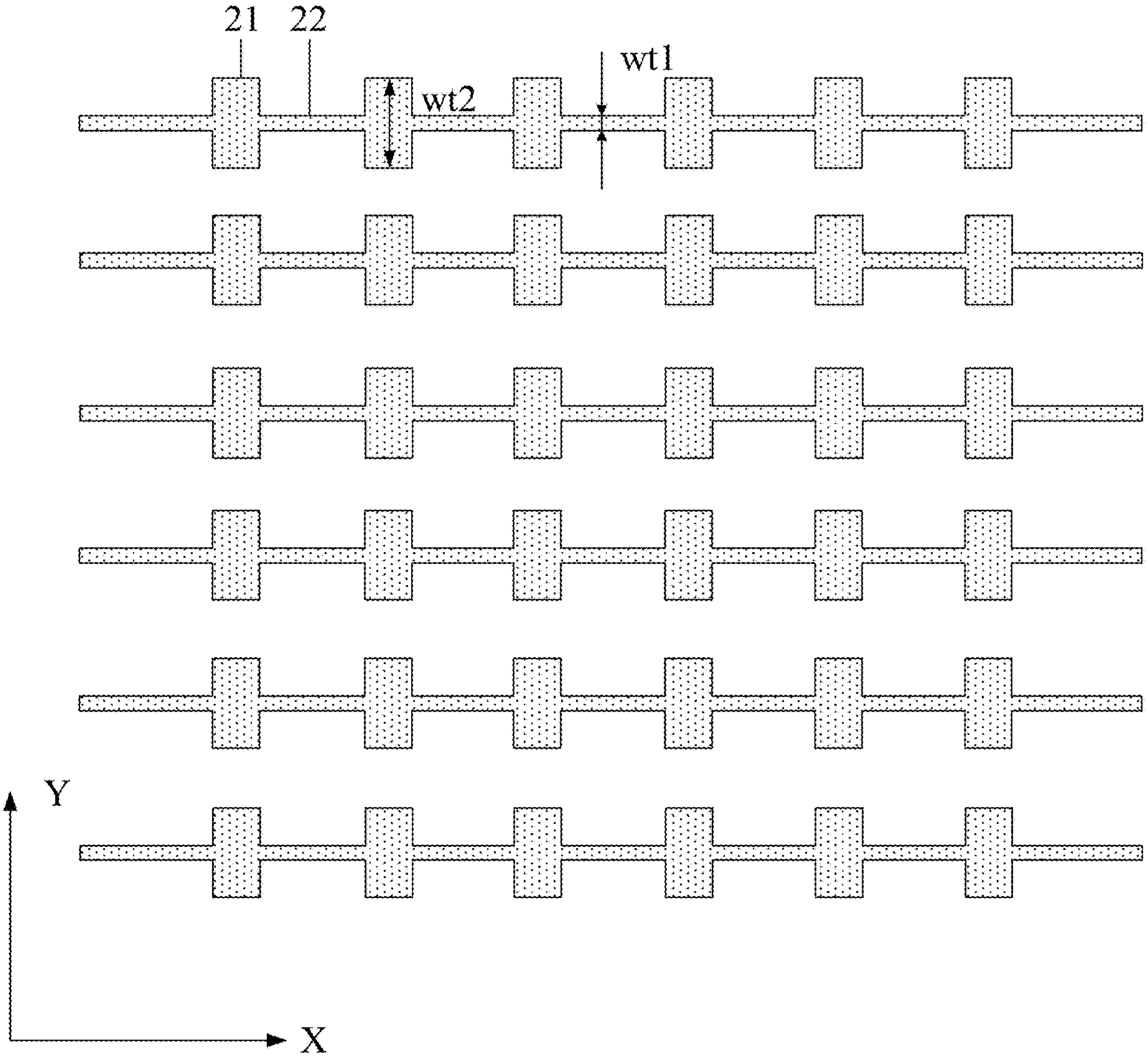
FIG. 7 is a schematic diagram of a second electrode layer according to some embodiments of the present disclosure.

In some embodiments, FIG. 7 is a schematic diagram of a second electrode layer according to some embodiments of the present disclosure. As shown in FIG. 7, the second electrode strip 2 includes a plurality of electrode portions 21 and connection portions 22 configured to connect two adjacent electrode portions 21. An orthographic projection of the electrode portion 21 on the first dielectric substrate 10 is overlapped with an orthographic projection of the first electrode strip 1 on the first dielectric substrate 10.

Furthermore, as shown in FIG. 7, a width wt2 of the electrode portion 21 in the second direction Y is greater than a width wt1 of the connection portion 22 in the second direction Y. In some embodiments, a ratio of the width of the electrode portion 21 to the width of the connection portion 22 in the second direction Y ranges from 2.57 to 2.58. Illustratively, the width wt2 of the electrode portion 21 in the second direction Y is 0.49 mm, and the width wt1 of the connection portion 22 in the second direction Y is 0.19 mm. compared with the structure shown in FIG. 1*a*, in the embodiments, the width wt1 of the connection portion 22 in the second direction Y is reduced, and the width wt2 of the electrode portion 21 in the second direction Y is increased, such that the transmission is improved, and the radiation gain of the antenna module including the meta-surface is further improved.

Figure 8A:
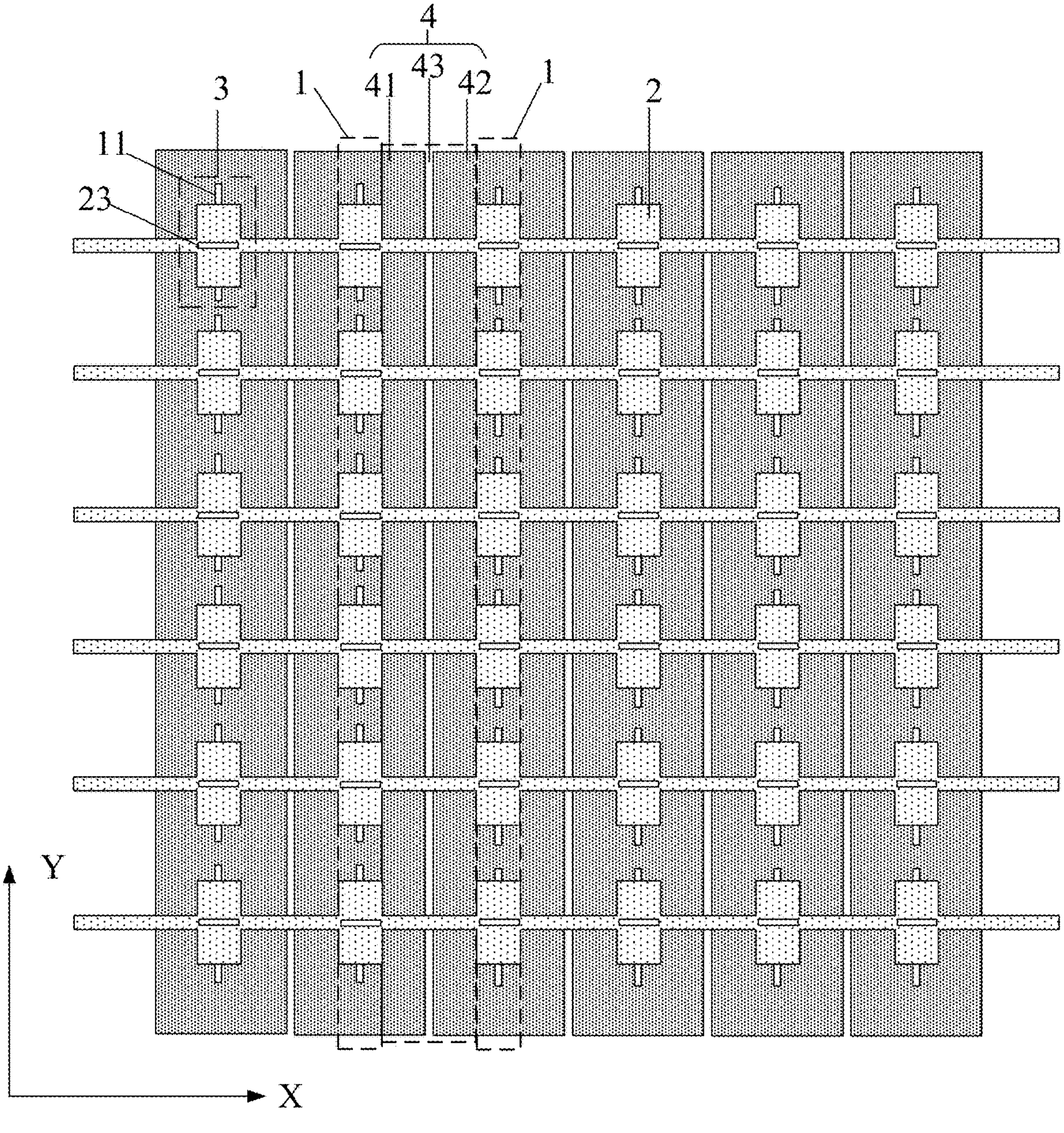
FIG. 8*a* is a schematic diagram of a meta-surface array according to some embodiments of the present disclosure.
Figure 8B:
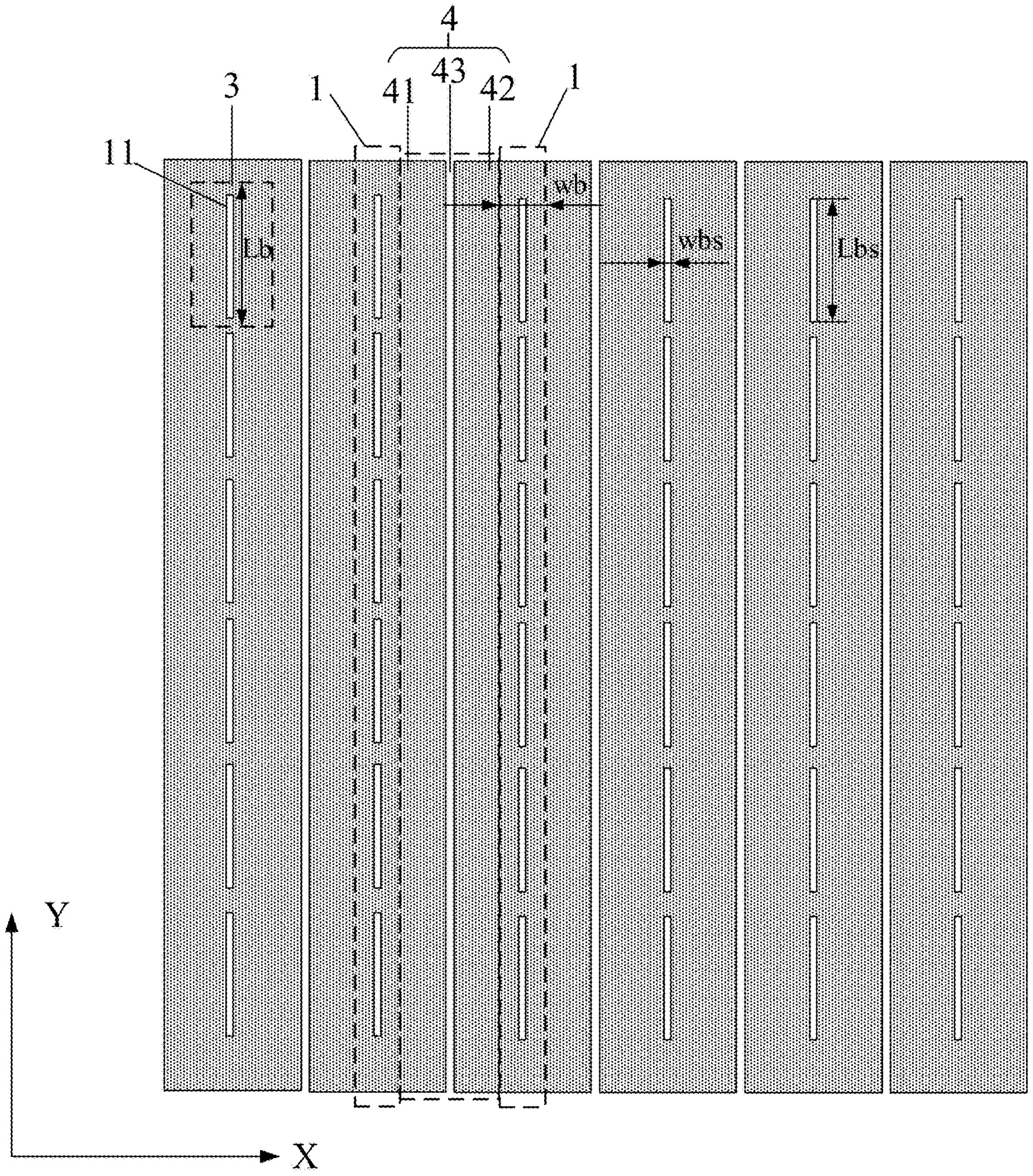
FIG. 8*b* is a schematic diagram of a first electrode layer in FIG. 8*a;*
Figure 8C:
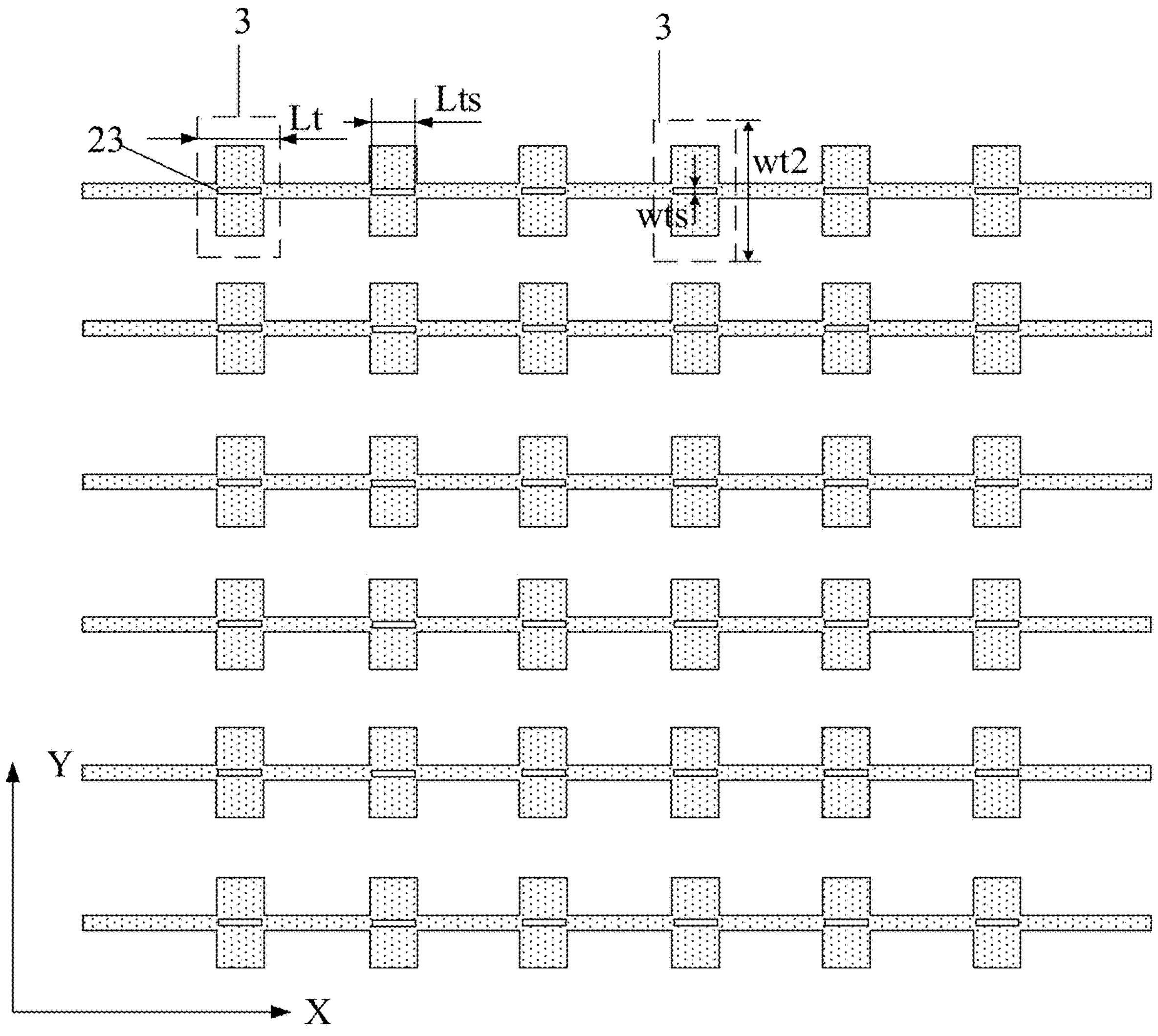
FIG. 8*c* is a schematic diagram of a second electrode layer in FIG. 8*a;*

In some embodiments, FIG. 8*a* is a schematic diagram of a meta-surface array according to some embodiments of the present disclosure. FIG. 8*b* is a schematic diagram of a first electrode layer in FIG. 8*a*. FIG. 8*c* is a schematic diagram of a second electrode layer in FIG. 8*a*. As shown in FIG. 8*a*, FIG. 8*b*, and FIG. 8*c*, the resonant unit 3 further includes a first via 11 defined in the first electrode strip 1 and a second via 23 defined in the second electrode strip 2. An orthographic projection of the first via 11 on the first dielectric substrate 10 is intersected with an orthographic projection of the second via 23 on the first dielectric substrate 10.

Furthermore, as shown in FIG. 8*a* and FIG. 8*b*, a ratio of a width of the first via 11 to a width of the first electrode strip 1 in the first direction X ranges from 0.02 to 0.06, and a ratio of the width of the first via 11 to a width of the resonant unit 3 in the second direction Y ranges from 0.3 to 0.5.

Illustratively, the width wbs of the first via 11 in the first direction X is 0.05 mm, and the width wb of the first electrode strip 1 in the first direction X is 1.1 mm, and wbs/wb=0.0455.

Illustratively, the width Lbs of the first via 11 in the second direction Y is 0.6 mm, and the width Lb of the resonant unit 3 in the second direction Y is 1.2 mm or 2.0 mm. In the case that Lb is 1.2 mm, Lbs/Lb=0.5. In the case that Lb is 2.0 mm, and Lbs/Lb=0.3. The width and the length of the first via 11 affect the resonant frequency of the electrode structure.

Furthermore, as shown in FIG. 8*b* and FIG. 8*c*, a ratio of a width of the second via 23 to a width of the resonant unit 3 in the first direction X ranges from 0.05 to 0.85, and a ratio of the width of the second via 23 to the width of the resonant unit 3 in the second direction Y ranges from 0.05 to 0.15.

Illustratively, the width Lts of the second via 23 in the first direction X is 0.6 mm, and the width Lt of the resonant unit 3 in the first direction X is 1.2 mm, Lts/Lt=0.5.

Illustratively, the width Wts of the second via 23 in the second direction Y is 0.05 mm, the width Wt2 of the resonant unit 3 in the second direction Y is 0.49 mm, and Wts/Wt2=0.102. The width and the length of the second via 23 affect the resonant frequency of the electrode structure.

Figure 9:
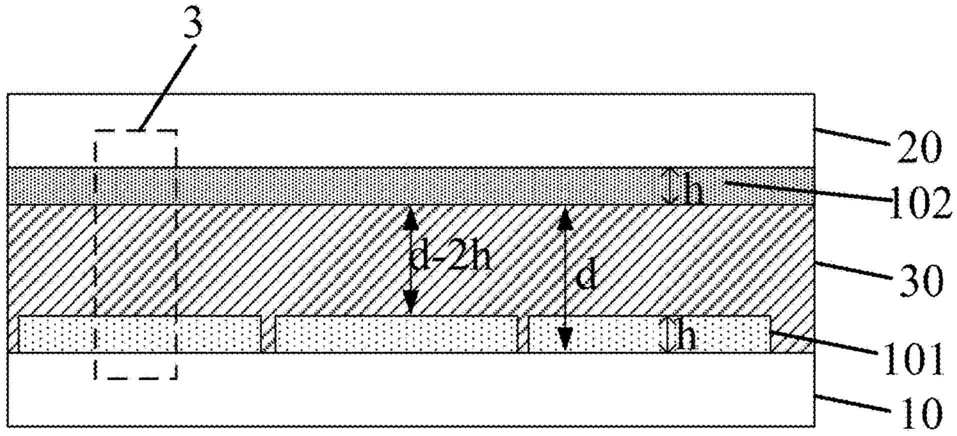
FIG. 9 is a section view of a meta-surface array in a section direction of A-A in FIG. 2*a;*

In some embodiments, FIG. 9 is a section view of a meta-surface array in a section direction of A-A in FIG. 2*a*. As shown in FIG. 9, the meta-surface includes a first substrate and a second substrate, and a tunable dielectric layer 30 between the first substrate and the second substrate. The first substrate includes a first dielectric substrate 10 and a first electrode layer 101 on a side, close to the tunable dielectric layer 30, of the first dielectric substrate 10, and the second substrate includes a second dielectric substrate 20 and a second electrode layer 102 on a side, close to the tunable dielectric layer 30, of the second dielectric substrate 20. The first electrode layer 101 includes a plurality of first electrode strips 1 juxtaposed in a first direction X and a filling structure 4 disposed between the adjacent first electrode strips 1.

Illustratively, as shown in FIG. 9, the tunable dielectric layer 30 is a liquid crystal layer, and a thickness d of the liquid crystal layer ranges from 8 μm to 10 μm. The liquid crystal layer in the embodiments has a lower thickness of sub-9 μm. The thickness of the liquid crystal layer is a factor for affecting the resonant frequency. The thinner the liquid crystal layer, the more the shift of the resonant frequency to the lower frequency. The thinner the liquid crystal layer, the lower the drive voltage, and the faster the response time of the liquid crystal layer.

Illustratively, the thickness of the first electrode layer 101 is represented by h, and h ranges from 2 μm to 5 μm, a distance between the first electrode layer 101 and the second electrode layer 102 is represented by d−2h. The thickness of the first electrode strip 1 is equal to the thickness of the filling structure 4, that is, the thickness of the first electrode layer 101 is h.

It should be noted that in the case that the crossbar is used to reconfigure the array, the voltages are respectively supplied on the first electrode strip 1 in the first electrode layer 101 and the second electrode strip 2 in the second electrode layer 102, and the difference in the voltage between the upper and lower electrodes causes liquid crystal molecules in the overlapped region of the upper and lower electrodes to be deflected, such that the capacitance between the upper and lower electrodes is changed, and the amplitude and phase of transmitted the electromagnetic wave are regulated.

Illustratively, in manufacturing the meta-surface, a first substrate is first formed, which includes providing a first dielectric substrate 10 and forming a material of the first electrode layer 101 on the first dielectric substrate 10. The material of the first electrode layer 101 includes the metal material, such as silicon nitride (SiN), molybdenum (Mo), copper (Cu), and the like. A first electrode strip 1 is formed by patterning process, and a first alignment layer is formed on a side, facing away from the first dielectric substrate 10, of the first electrode strip 1. A pillar spacer is formed on the first gap 43 (or the second gap 44) to support the first substrate and the second substrate. The process of forming the second substrate is the same as the process of forming the first substrate, which includes providing a second dielectric substrate 20 and forming a material of the second electrode layer 102 on the second dielectric substrate 20. The material of the second electrode layer 102 includes the metal material, such as silicon nitride (SiN), molybdenum (Mo), copper (Cu), and the like. A second electrode strip 2 is formed by patterning process, and a second alignment layer is formed on a side, facing away from the second dielectric substrate 20, of the second electrode strip 2. The first substrate and the second substrate are attached, supported by the pillar spacer, and sealed to form a sealed space. The liquid crystal is poured into the sealed space to form the liquid crystal layer, and thus the meta-surface is acquired. Compared with other phase-shifting structure, the meta-surface is used in the embodiments of the present disclosure to achieve the beam tuning, and the manufacturing process of the meta-surface is simple.

In a second aspect, the embodiments of the present disclosure further provide an antenna module. The antenna module includes at least one meta-surface 00 according to any of the above embodiments and an antenna 40.

The antenna 40 is a dipole antenna or an omni antenna, and is set as required to ensure that the antenna module can achieve radiation modes, such as multi-beam radiation, single-beam radiation, switch from multi-beam to single-beam, switch from single-beam to multi-beam, and the like.

In some embodiments, the antenna module includes a plurality of meta-surfaces 00, the antenna is disposed in a region defined by the plurality of meta-surfaces 00, and the second electrode layer 102 is closer to the antenna 40 than the first electrode layer 101.

The multi-beam radiation is achieved in the case that the plurality of meta-surfaces 00 operate in the transmission mode. As the antenna module in the embodiments of the present disclosure uses the meta-surface 00 provided in the first aspect, the insertion loss (S21) is reduced to improve the transmission of the millimeter wave in the transmission operation mode, and the gain of the multi-beam antenna 40 of the antenna module is further improved.

The single-beam radiation is achieved in the case that one meta-surface 00 operates in the transmission mode and another meta-surfaces 00 operate in the reflection mode. As the antenna module in the embodiments of the present disclosure uses the meta-surface 00 provided in the first aspect, the reflection of the millimeter wave is improved in the reflection operation mode, and the gain of the single-beam antenna 40 of the antenna module is further improved.

Figure 10:
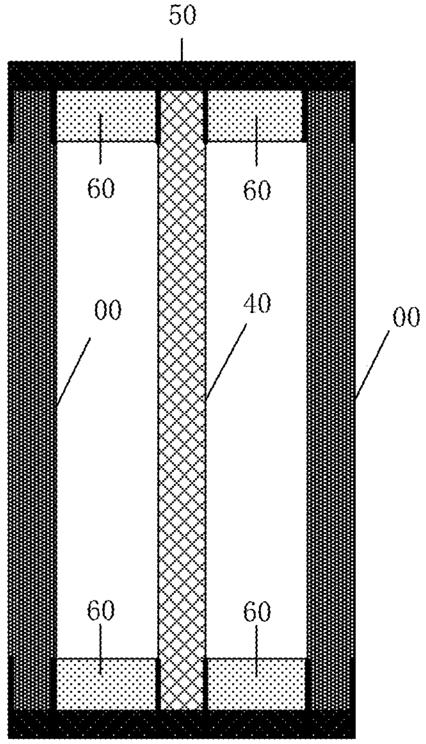
FIG. 10 is a schematic diagram of an antenna module according to some embodiments of the present disclosure.

In some embodiments, FIG. 10 is a schematic diagram of an antenna module according to some embodiments of the present disclosure. As shown in FIG. 10, the antenna module includes two opposite meta-surfaces 00, and the antenna 40 is disposed between the two opposite meta-surfaces 00. The second electrode layer 102 is closer to the antenna 40 than the first electrode layer 101.

The switch from multi-beam to single-beam is achieved in the case that one of the two opposite meta-surfaces 00 operates in the transmission mode and the other of the two opposite meta-surfaces 00 operates in the reflection mode. In the case that the two meta-surfaces 00 are opposite to each other, the meta-surface operating in the reflection mode completely reflects all beams to the other meta-surface 00 to be transmitted, and the gain of the single-beam antenna 40 is improved by virtue of the high transmission and high reflection of the meta-surface 00.

In some embodiments, as shown in FIG. 10, the antenna module further includes a structure support 50 configured to secure the meta-surface 00 and the antenna 40. A wave-absorbing structure 60 is also disposed between the antenna 40 and the meta-surface 00, the wave-absorbing structure 60 is attached to the structure support 50 and is configured to absorb the reflective wave of the meta-surface 00.

Furthermore, an outline of an orthographic projection of the wave-absorbing structure 60 on the meta-surface 00 is annular, and the wave-absorbing structure 60 is connected to an edge of the meta-surface 00.

Figure 11A:
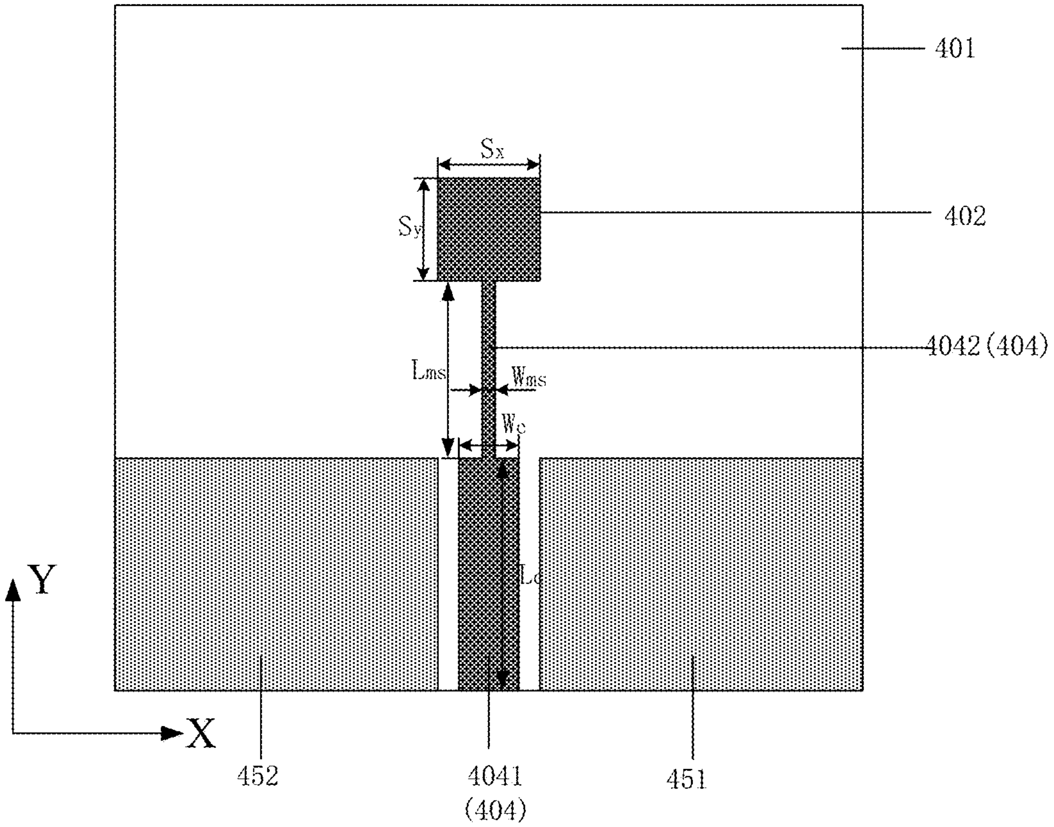
FIG. 11*a* is a top view of a front view of a dipole antenna according to some embodiments of the present disclosure.
Figure 11B:
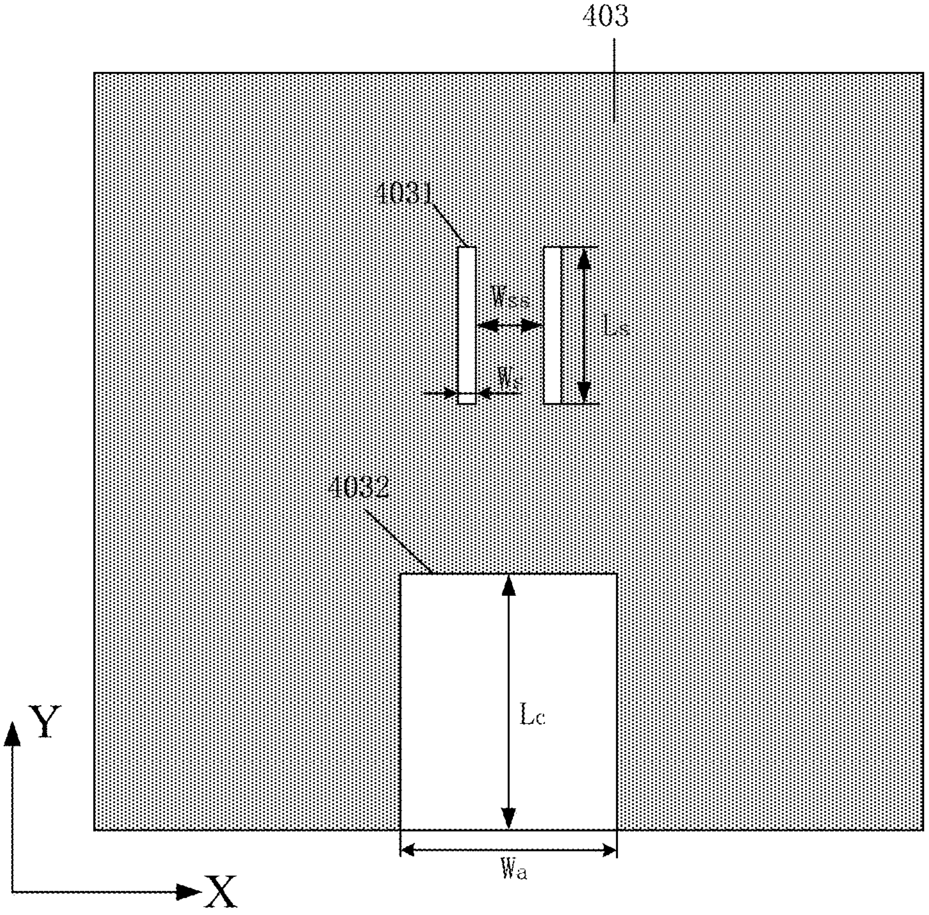
FIG. 11*b* is a top view of a rear view of a dipole antenna.

The antenna 40 in the embodiments of the present disclosure uses the dipole antenna 40. FIG. 11*a* is a top view of a front view of a dipole antenna according to some embodiments of the present disclosure. FIG. 11*b* is a top view of a rear view of a dipole antenna. As shown in FIG. 11*a* and FIG. 11*b*, illustratively, the dipole antenna 40 includes a third dielectric substrate 401, a radiation electrode 402 and a feed structure on a side of the third dielectric substrate 401, and a reference electrode 403 on a side, facing away from the radiation electrode 402, of the third dielectric substrate 401. The radiation electrode 402 is electrically connected to the feed structure.

A third via 4031 is defined in the reference electrode 403, an orthographic projection of the third via 4031 on the third dielectric substrate 401 is at least partially overlapped with an orthographic projection of the radiation electrode 402 on the third dielectric substrate 401. The radiation wave generated by the antenna is radiated in a direction of the radiation electrode 402 facing away from the third dielectric substrate 401. Meanwhile, the radiation wave generated by the antenna is radiated in a direction of the third dielectric substrate 401 facing away from the radiation electrode 402 through the third via 4031. In the case that the two opposite meta-surfaces 00 operate in the transmission mode, the radiation wave is irradiated from the two meta-surfaces 00. In the case that one of the two opposite meta-surfaces 00 operates in the transmission mode, and the other of the two opposite meta-surfaces 00 operates in the reflection mode, the meta-surface 00 operating in the reflection mode reflects the radiation wave and irradiates the radiation wave to the other meta-surface 00 through the third via 4031 to be transmitted, such that the switch from dual-beam to single-beam is achieved.

Illustratively, two third vias 4031 are defined in the reference electrode 403, and orthographic projections of the two third vias 4031 on the third dielectric substrate 401 are overlapped with the orthographic projection of the radiation electrode 402 on the third dielectric substrate 401.

Figure 12A:
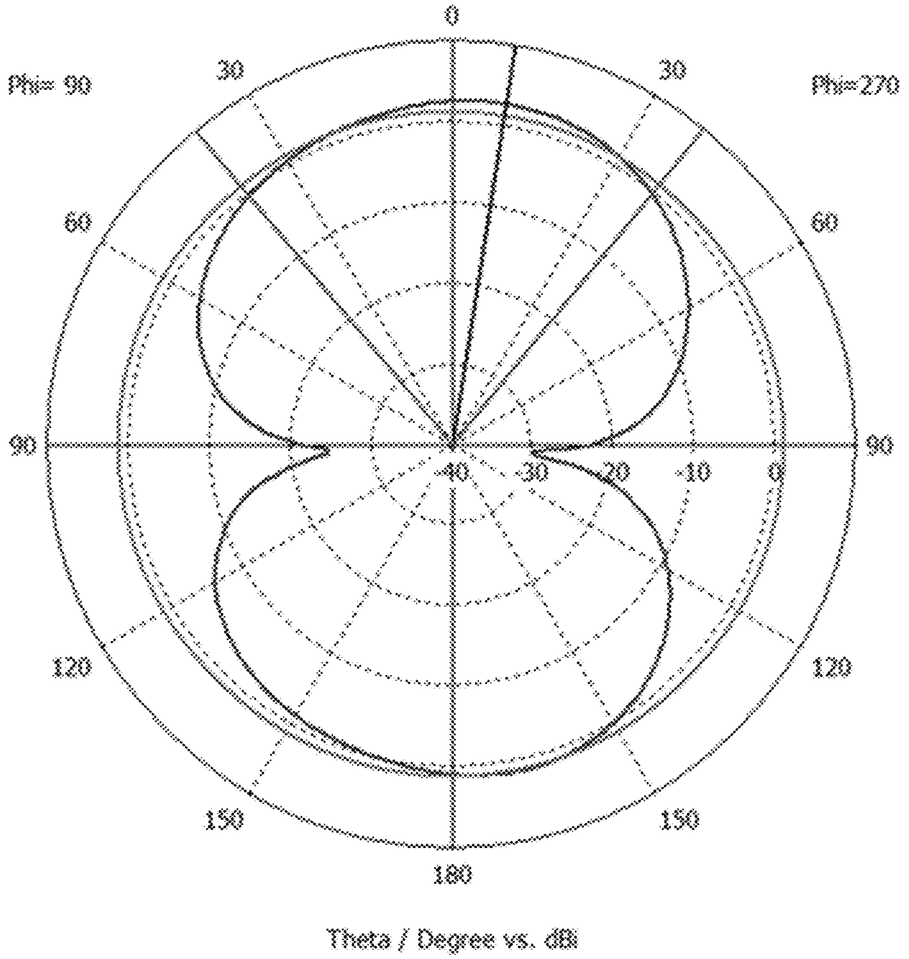
FIG. 12*a* is a schematic diagram of radiation direction gain of the structure in FIG. 10 operating in a transmission mode.
Figure 12B:
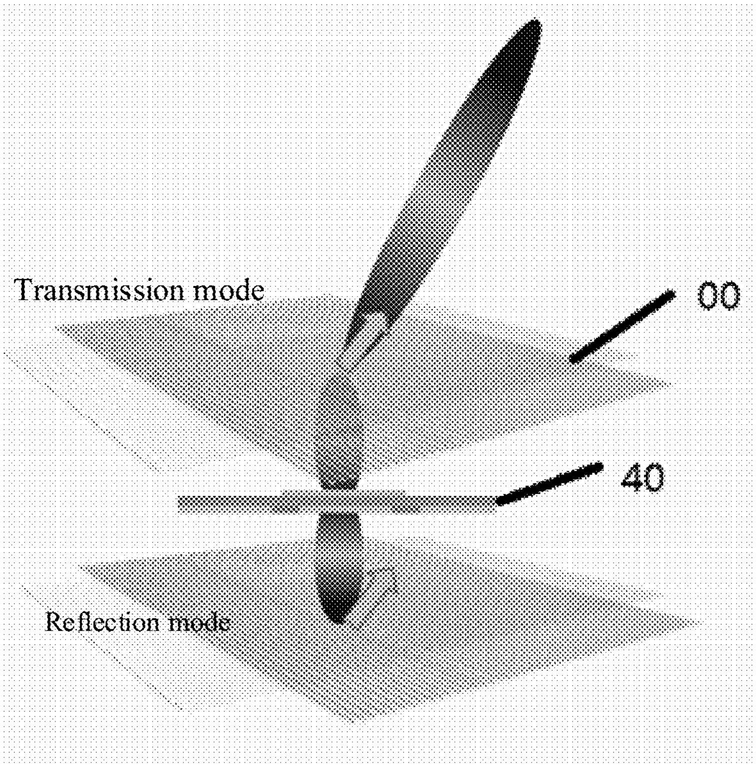
FIG. 12*b* is a schematic diagram of radiation directions of one of the two meta-surfaces in FIG. 10 operating in a transmission mode and the other of the two meta-surfaces in FIG. 10 operating in a reflection mode.
Figure 12C:
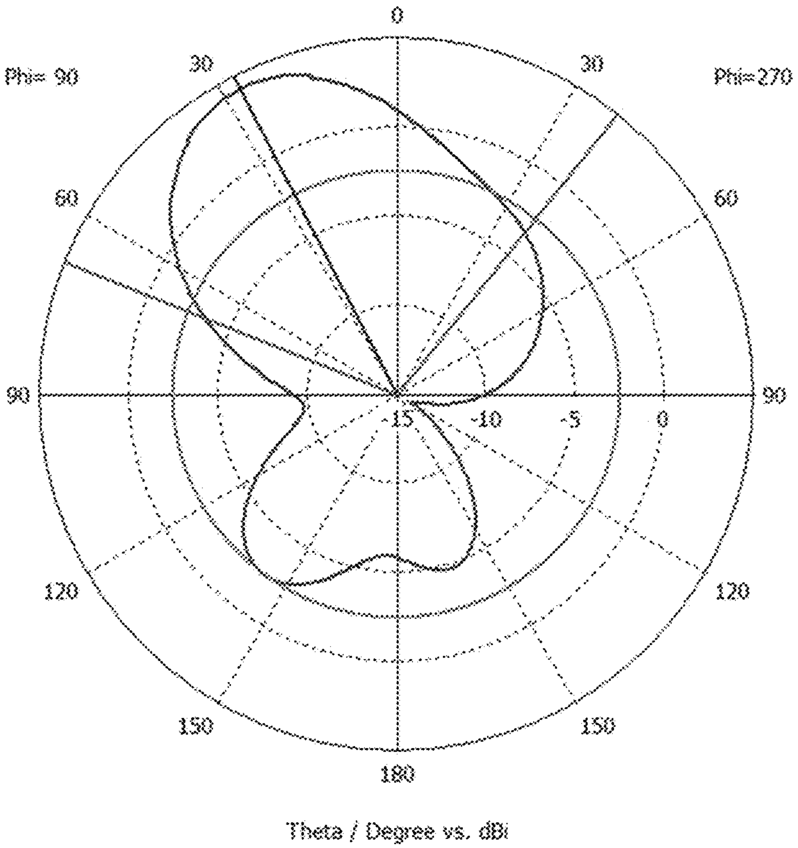
FIG. 12*c* is a schematic diagram of radiation direction gain of one of the two meta-surfaces in FIG. 10 operating in a transmission mode and the other of the two meta-surfaces in FIG. 10 operating in a reflection mode.

Illustratively, the feed structure uses a coplanar waveguide (CPW) structure. The feed structure includes a transmission line 404, and a first reference sub-electrode 451 and a second reference sub-electrode 452 that are disposed on two sides of the transmission line 404 in the first direction X. A fourth via 4032 is further defined in the reference electrode 403, and an orthographic projection of the fourth via 4032 on the third dielectric substrate 401 covers an orthographic projection of the transmission line 404 on the third dielectric substrate 401. The transmission line 404 includes a first transmission portion 4041 and a second transmission portion 4042 that are electrically connected to each other. The first transmission portion 4041 is electrically connected to an external feed source, and the second transmission portion 4042 is electrically connected to the radiation electrode 402. A width of the first transmission portion 4041, a width of the first reference sub-electrode 451, and a width of the second reference sub-electrode 452 in the second direction Y are equal. Illustratively, a width $S_x$ of the radiation electrode 402 in the first direction X is 3.2 mm, and a width $S_y$ of the radiation electrode 402 in the second direction Y is 1.6 mm. A width $W_c$ of the first transmission portion 4041 in the first direction X is 0.5 mm, and a width $L_c$ of the first transmission portion 4041 in the second direction Y is 6 mm. A width $W_{ms}$ of the second transmission portion 4042 in the first direction X is 0.046 mm, and a width $L_{ms}$ of the second transmission portion 4042 in the second direction Y is 1.6 mm. A width $W_s$ of the third via 4031 in the first direction X is 0.1 mm, and a width $L_s$ of the third via 4031 in the second direction Y is 4.2 mm. a minimum distance $W_{ss}$ between two third vias 4031 in the first direction X is 3.06 mm. A width $W_a$ of the fourth via 4032 in the first direction X is 1.4 mm, and a width Le of the fourth via 4032 in the second direction Y is 6 mm. Furthermore, a distance between the antenna 40 and the meta-surface 00 ranges from 0.45 to 0.55 radiation wavelength. By taking the above exemplar parameters as an example, the radiation gain of the antenna module operating in the transmission mode was tested. FIG. 12*a* is a schematic diagram of radiation direction gain of the structure in FIG. 10 operating in a transmission mode. As shown in FIG. 12*a*, in the case that the distance between the antenna 40 and the meta-surface 00 is ½ radiation wavelength, and the two opposite meta-surfaces 00 operate in the transmission mode, 2.5 dBi radiation gain is acquired. FIG. 12*b* is a schematic diagram of radiation directions of one of the two meta-surfaces in FIG. 10 operating in a transmission mode and the other of the two meta-surfaces in FIG. 10 operating in a reflection mode. FIG. 12*c* is a schematic diagram of radiation direction gain of one of the two meta-surfaces in FIG. 10 operating in a transmission mode and the other of the two meta-surfaces in FIG. 10 operating in a reflection mode. As shown in FIG. 12*b* and FIG. 12*c*, in the case that the distance between the antenna 40 and the meta-surface 00 is ½ radiation wavelength, one of the two opposite meta-surfaces 00 operates in the transmission mode, and the other of the two opposite meta-surfaces 00 operates in the reflection mode, 4.3 dBi radiation gain is acquired.

In some embodiments, the antenna module includes two meta-surfaces 00, and extension surfaces of the two meta-surfaces 00 are intersected. The antenna 40 is disposed in a region defined by the two meta-surfaces 00. The second electrode layer 102 is closer to the antenna 40 than the first electrode layer 101.

The antenna 40 uses the dipole antenna 40, and detailed structure of the dipole antenna 40 is referred to FIG. 11, which are not repeated herein.

It should be noted that, compared with the opposite meta-surfaces 00, the transmission of the switch from multi-beam to single-beam is less in the embodiments. However, the greater radiation gain is not better in various application scenarios, and thus the antenna module with the proper structure is selected according to the actual demands.

Figure 13A:
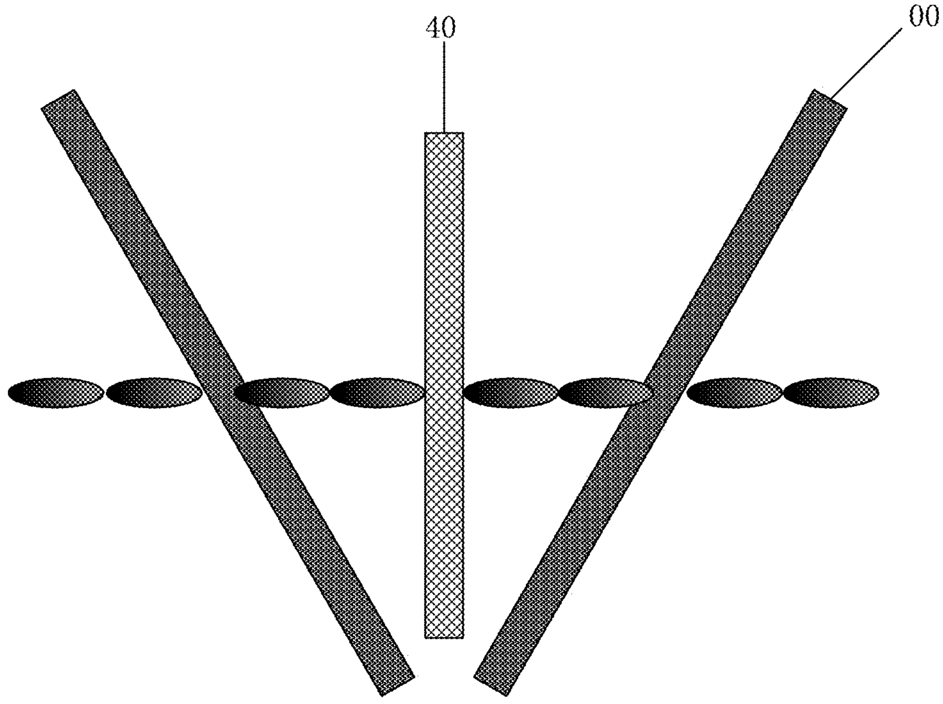
FIGS. 13*a*-13*c* are schematic diagrams of an antenna module according to some embodiments of the present disclosure.
Figure 13B:
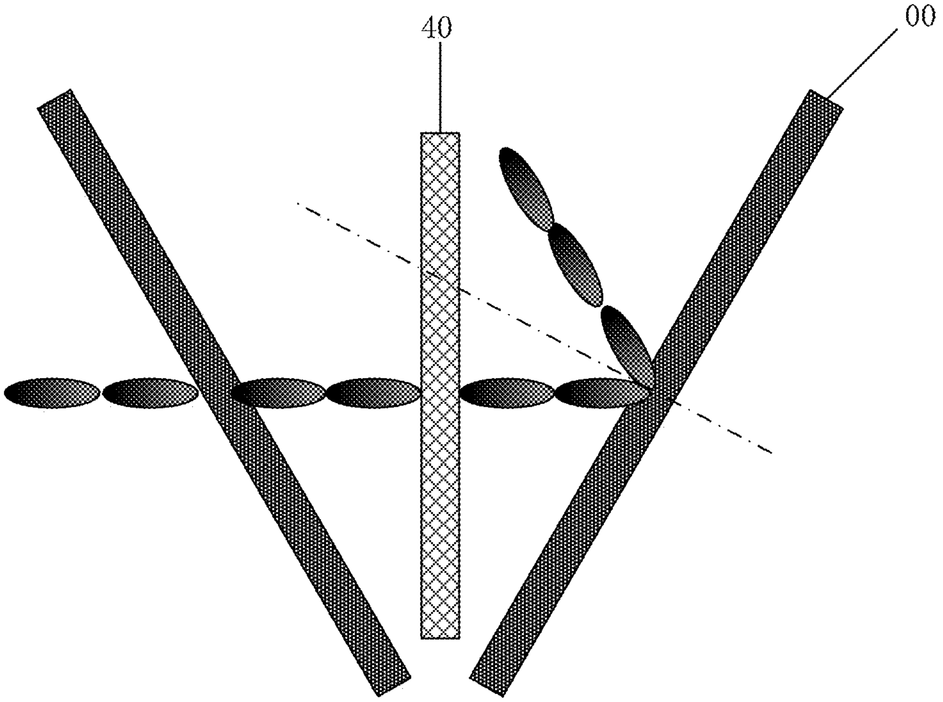
Figure 13C:
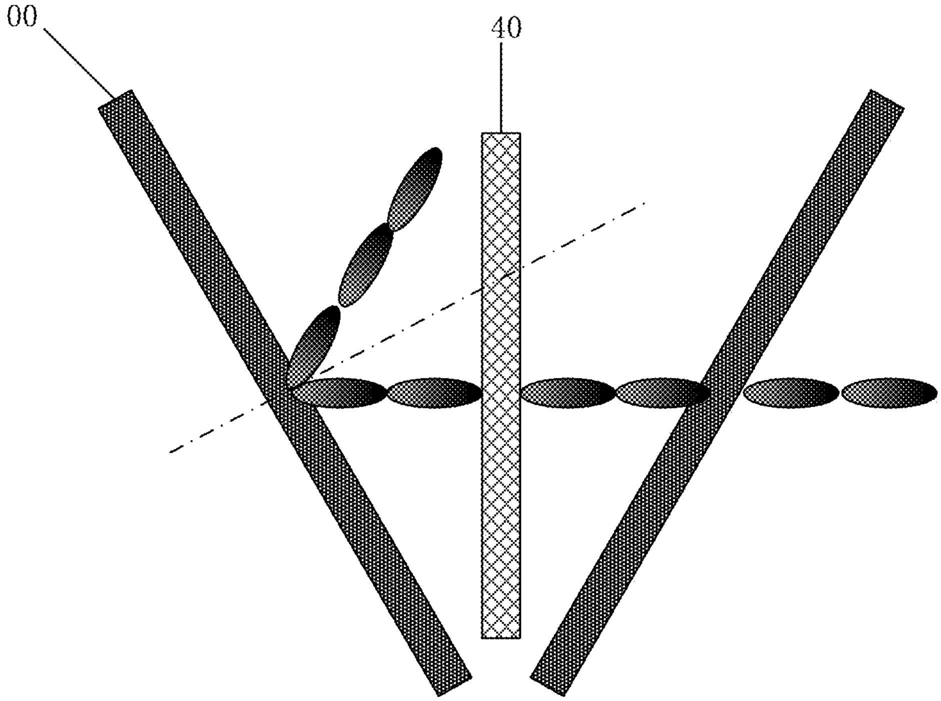

Illustratively, FIGS. 13*a*-13*c* are schematic diagrams of an antenna module according to some embodiments of the present disclosure. As shown in FIGS. 13*a*-13*c*, an included angle between the extension surfaces of the two meta-surfaces 00 is less than 90°. As shown in FIG. 13*a*, for the meta-surfaces 00 all operate in the transmission mode, the gain of the dual-beam antenna 40 is improved by virtue of the high transmission of the meta-surface 00. As shown in FIG. 13*b* and FIG. 13*c*, for two meta-surfaces 00 with an included angle between the extension surfaces of the two meta-surfaces 00 less than 90°, one of the two meta-surfaces 00 operates in the transmission mode, and the other of the two meta-surfaces 00 operates in the reflection mode, such that the switch from multi-beam to single-beam is achieved. Meanwhile, the meta-surface operating in the reflection mode reflects partial beams to the other of the two meta-surfaces 00 to be transmitted, and the gain of the single-beam antenna 40 is improved by virtue of the high transmission and high reflection of the meta-surface 00.

Figure 14A:
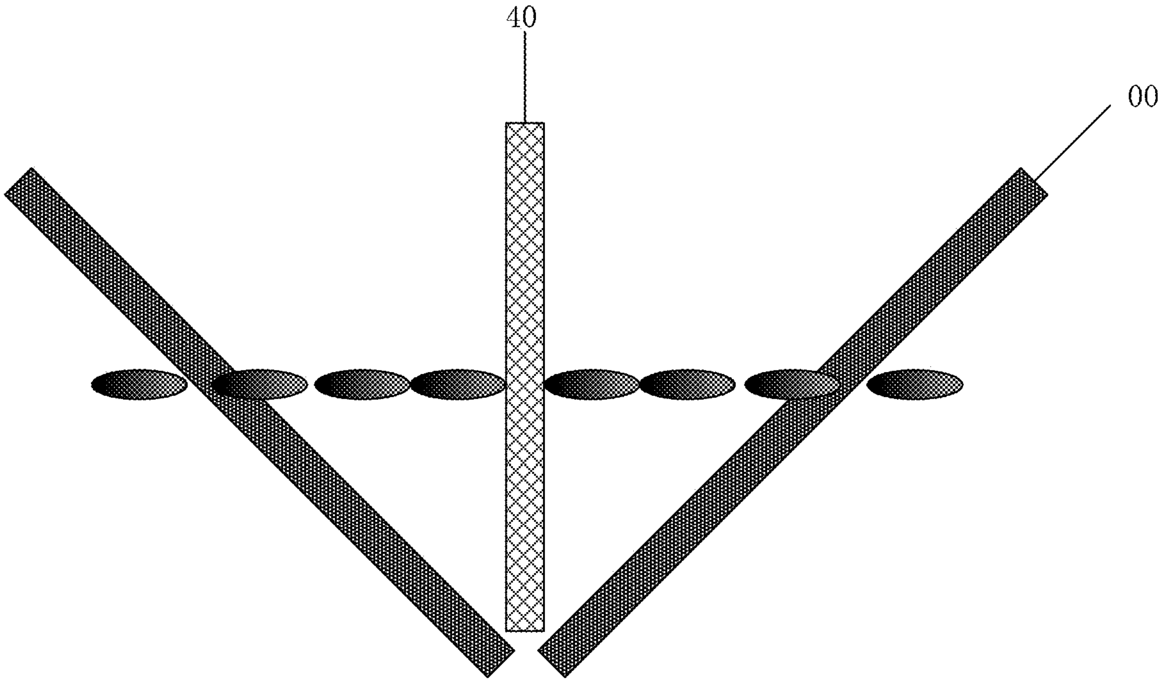
FIGS. 14*a*-14*d* are schematic diagrams of an antenna module according to some embodiments of the present disclosure.
Figure 14B:
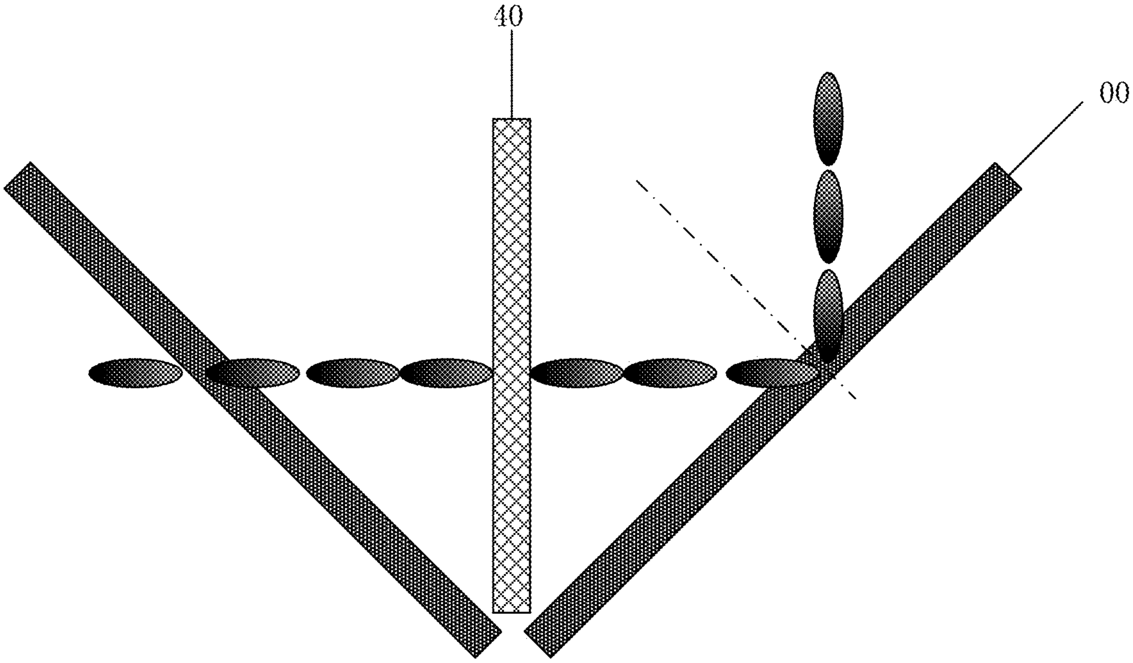
Figure 14C:
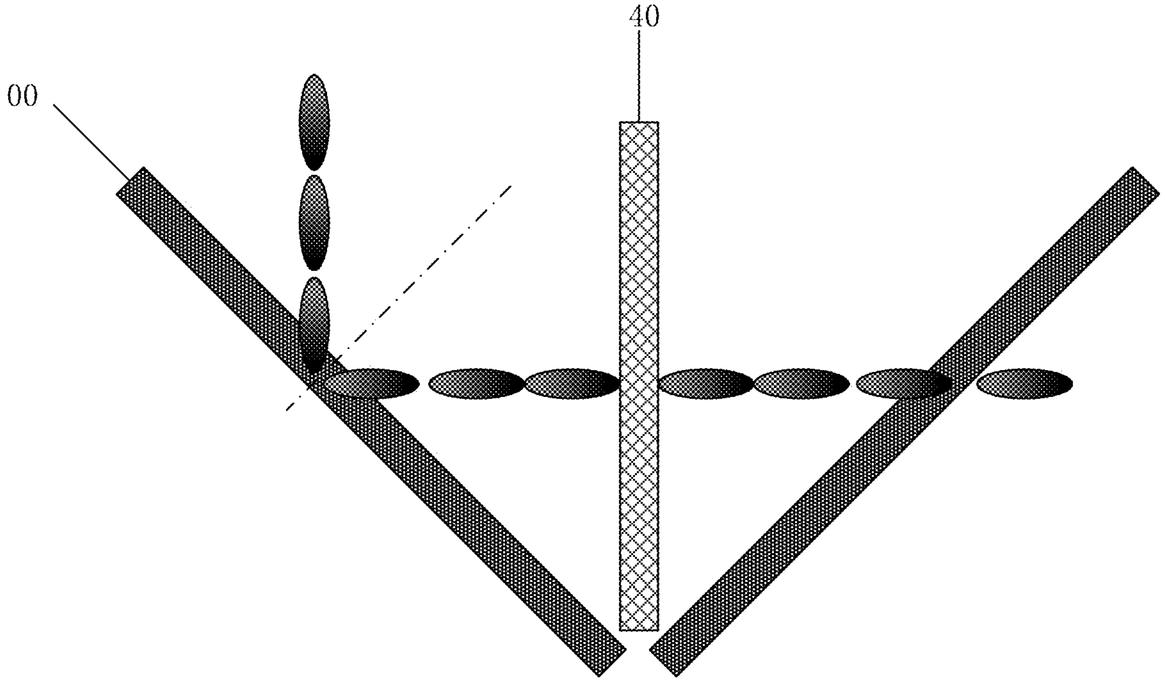
Figure 14D:
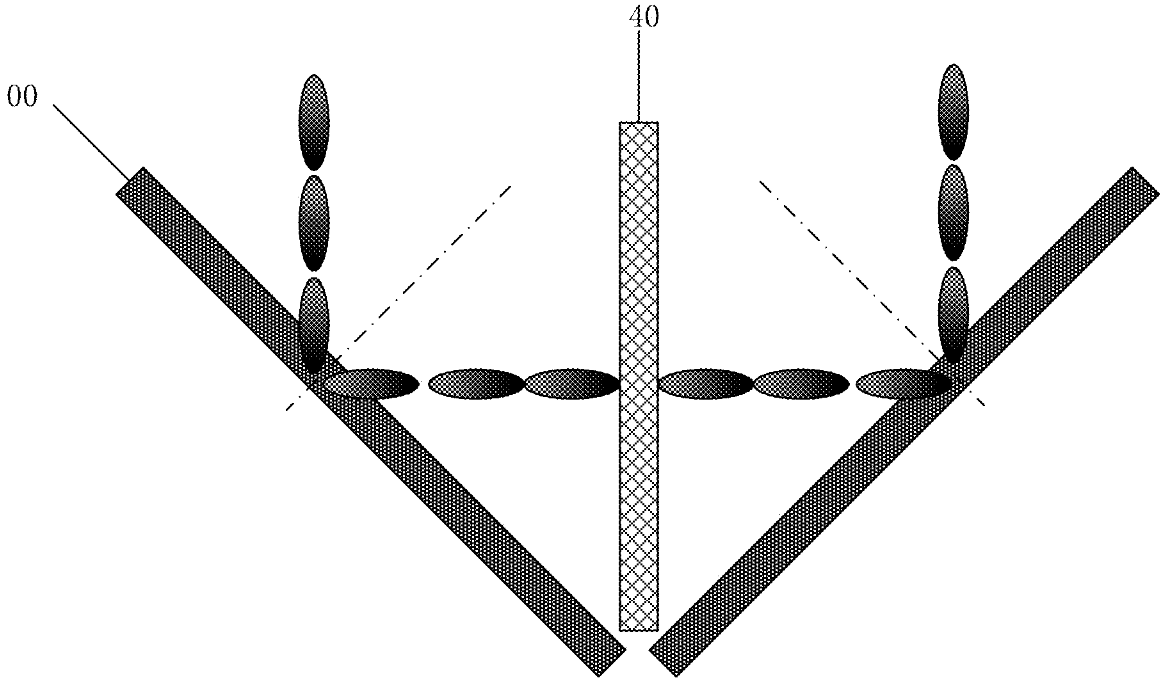

Illustratively, an included angle between the extension surfaces of the two meta-surfaces 00 is greater than or equal to 90°. By taking the included angle between the extension surfaces of the two meta-surfaces 00 being equal to 90°, that is, the extension surfaces of the two meta-surfaces 00 being orthometric as an example, FIGS. 14*a*-14*d* are schematic diagrams of an antenna module according to some embodiments of the present disclosure. As shown in FIGS. 14*a*-14*d*, the antenna module includes two meta-surfaces 00, and the extension surfaces of the two meta-surfaces 00 are intersected. As shown in FIG. 14*a*, for the meta-surfaces 00 all operate in the transmission mode, the gain of the dual-beam antenna 40 is improved by virtue of the high transmission of the meta-surface 00. As shown in FIG. 14*b* and FIG. 14*c*, for two meta-surfaces 00 with the extension surfaces of the two meta-surfaces 00 being intersected, one of the two meta-surfaces 00 operates in the transmission mode, and the other of the two meta-surfaces 00 operates in the reflection mode, such that the switch from multi-beam to single-beam is achieved. Meanwhile, the meta-surface 00 operating in the reflection mode reflects the beams in a direction perpendicular to the transmitted beams, and the gain of the antenna 40 is reduced compared with the case that the meta-surfaces 00 are opposite and the included angle between the extension surfaces is less than 90°. As shown in FIG. 14*d*, for the meta-surfaces 00 all operate in the reflection mode, the gain of the dual-beam antenna 40 operating in the reflection mode is improved by virtue of the high reflection of the meta-surface 00.

Furthermore, two dihedral angles formed by extension surfaces of the antenna 40 and the extension surfaces of the two meta-surfaces 00 are equal.

Figure 15A:
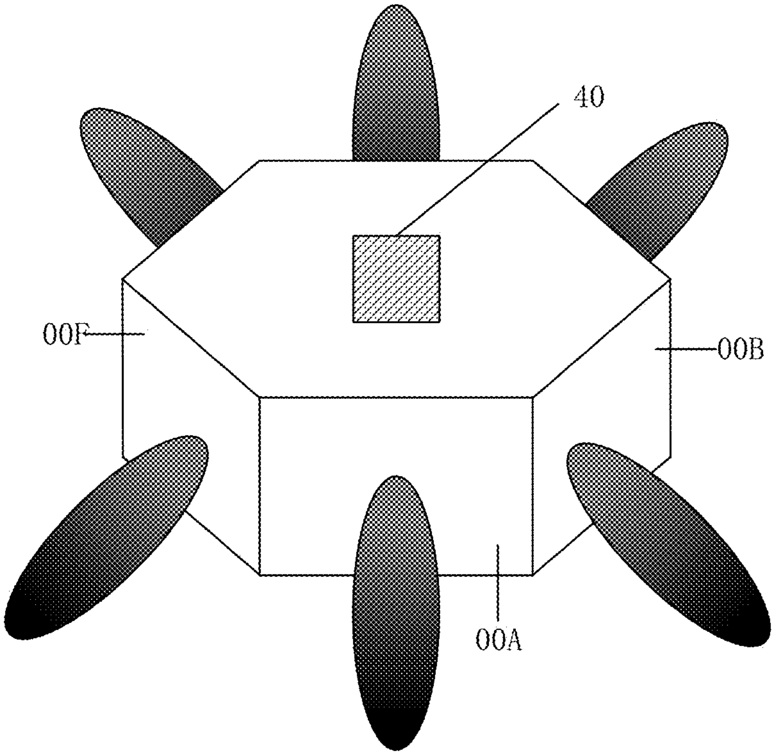
FIG. 15*a* is a schematic diagram of an antenna module according to some embodiments of the present disclosure.

In some embodiments, FIG. 15*a* is a schematic diagram of an antenna module according to some embodiments of the present disclosure. As shown in FIG. 15*a*, the antenna module includes a plurality of meta-surfaces 00. The plurality of meta-surfaces 00 are sequentially connect to form an annular structure, and the antenna 40 is disposed in the annular structure formed by the plurality of meta-surfaces 00.

The antenna is an omni antenna, that is, 360° uniform radiation performed in the horizontal pattern, which is commonly referred to as non-directional. In some embodiments, the antenna 40 in the embodiments is other multi-beam antennas 40, which are not limited.

The plurality of annular meta-surfaces 00 structure are combined with the omni-radiation antenna 40 to configure a system for switching from the single-beam to multi-beam.

Illustratively, the plurality of annular meta-surfaces 00 structure are combined with the omni-radiation antenna 40. For all meta-surfaces 00 operate in the transmission mode, the gain of the multi-beam antenna 40 is improved and the omni-radiation is achieved by virtue of the high transmission and high reflection of the meta-surfaces 00.

Figure 15B:
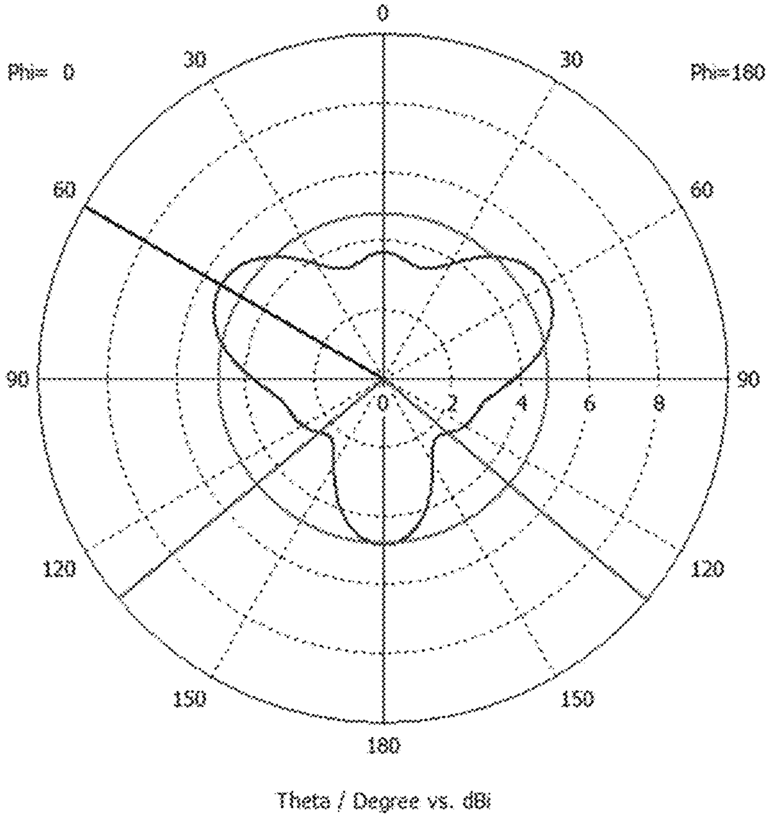
FIG. 15*b* is a schematic diagram of radiation direction gain in switching from multi-beam to multi-beam according to some embodiments of the present disclosure.

Illustratively, the multi-beam is switched to the multi-beam. FIG. 15*b* is a schematic diagram of radiation direction gain in switching from multi-beam to multi-beam according to some embodiments of the present disclosure. As shown in FIG. 15*a* and FIG. 15*b*, for the meta-surfaces 00 in the transmission mode, the meta-surface 00A, the meta-surface 00C, and the meta-surface 00E are tuned to be in the reflection mode, and the transmission modes of the meta-surface 00B, the meta-surface 00D, and the meta-surface 00D are unchanged, such that the switch from the omni beams to three beams is achieved. The radiation gain of 5.43 dBi is acquired by virtue of the high transmission and high reflection of the meta-surfaces 00.

Figure 15C:
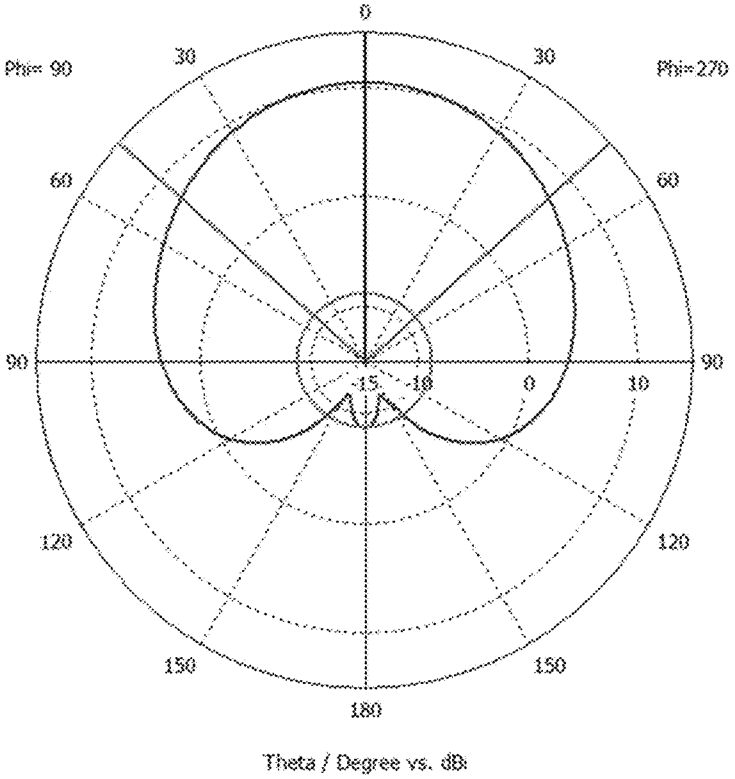
FIG. 15*c* is a schematic diagram of radiation direction gain in switching from multi-beam to single-beam according to some embodiments of the present disclosure.
Figure 15D:
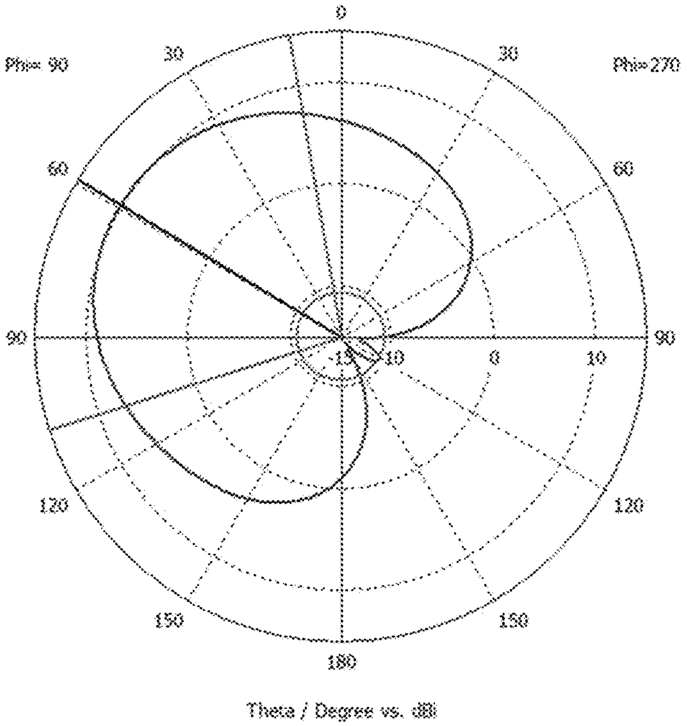
FIG. 15*d* is a schematic diagram of radiation direction gain of switch of single-beam according to some embodiments of the present disclosure.

Illustratively, the multi-beam is switched to the single-beam. FIG. 15*c* is a schematic diagram of radiation direction gain in switching from multi-beam to single-beam according to some embodiments of the present disclosure. As shown in FIG. 15*a* and FIG. 15*c*, for the meta-surfaces 00 in the transmission mode, the meta-surface 00E, the meta-surface 00B, the meta-surface 00C, the meta-surface 00D, and the meta-surface 00F are tuned to be in the reflection mode, and the transmission mode of the meta-surface 00A is unchanged, such that the switch from the omni beams to one beam is achieved. The radiation gain of 5.43 dBi is acquired by virtue of the high transmission and high reflection of the meta-surfaces 00. In a communication scenario requiring greater gain, the high gain of the single beam is used. Meanwhile, a main lobe direction of the single beam is controllable. FIG. 15*d* is a schematic diagram of radiation direction gain of switch of single-beam according to some embodiments of the present disclosure. As shown in FIG. 15*a* and FIG. 15*d*, for the meta-surfaces 00B, the meta-surface 00C, the meta-surface 00D, the meta-surface 00E, and the meta-surface 00F in the reflection mode, and the meta-surface 00A in the transmission mode, the meta-surfaces 00B is tuned to be in the transmission mode, and the transmission mode of the meta-surface 00A is unchanged, such that a switch of the beam deflecting by 60° is achieved. That is, the switch of the radiation direction from the single-beam to single-beam improves the coverage range of the beam of the antenna module. Meanwhile, the radiation gain of 10.2 dBi is acquired by virtue of the high transmission of the meta-surfaces 00.

It should be noted that the free switch between the single-beam and the multi-beam is significant because the single-beam with greater gain is required rather than multi-beam with less gain in specific scenarios.

Furthermore, the omni antenna 40 is disposed in a geometric center position of the annular structure formed by sequentially connecting the plurality of meta-surfaces 00 to balance the radiation gain of the meta-surfaces 00.

In some embodiments, the antenna module further includes a drive module. The drive module is configured to sequential supply incrementing bias voltages to the plurality of first electrode strips 1 in accordance with an arrangement sequence of the plurality of first electrode strips 1, such that a scanning range of a beam formed by the antenna module is offset by +12° in a direction perpendicular to a normal of the meta-surface 00.

Figure 16:
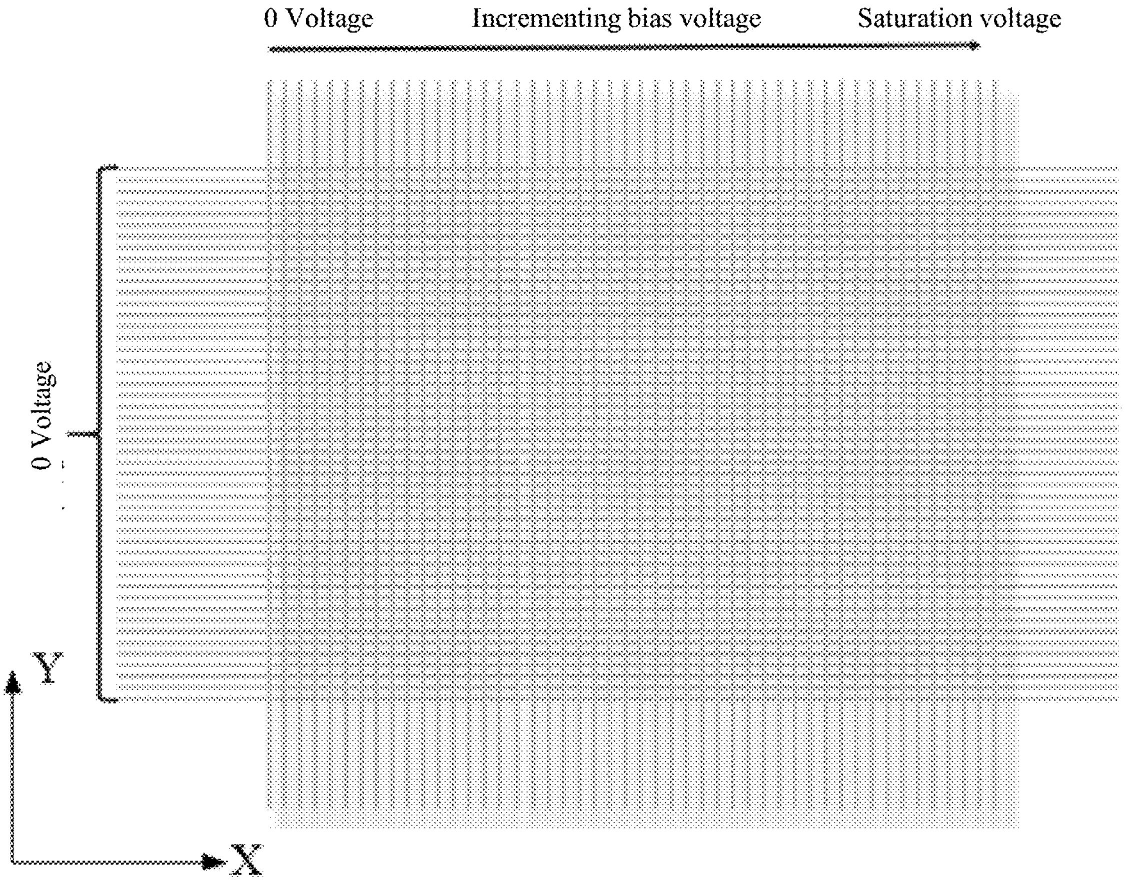
FIG. 16 is a schematic diagram of drive of a meta-surface according to some embodiments of the present disclosure.
Figure 17:
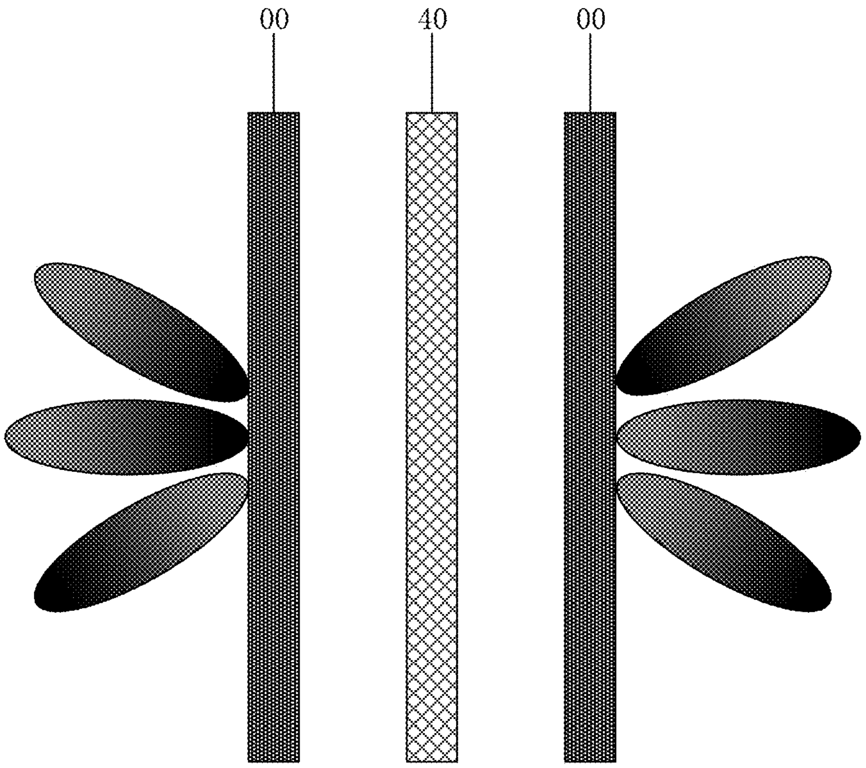
FIG. 17 is a schematic diagram of beam scan in the drive mode shown in FIG. 16.
Figure 18:
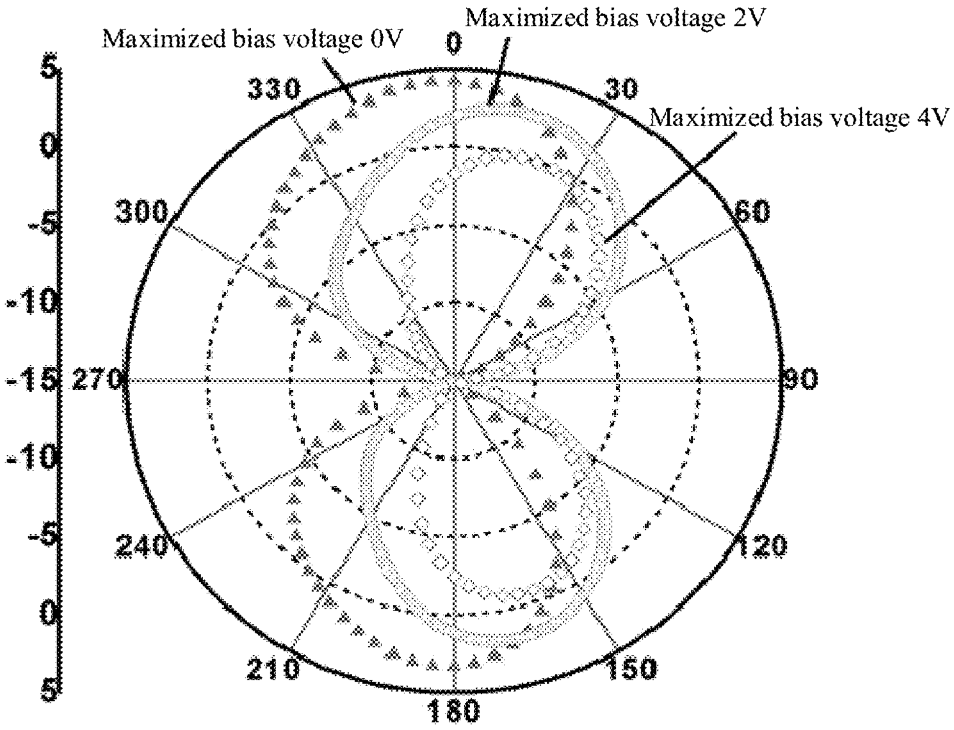
FIG. 18 is a schematic diagram of radiation direction gain in the drive mode shown in FIG. 16.

FIG. 16 is a schematic diagram of drive of a meta-surface according to some embodiments of the present disclosure. As shown in FIG. 16, the drive module is configured to sequential supply incrementing bias voltages to the first electrode strips 1 in accordance with an arrangement sequence of the first electrode strips 1 and to load the same voltage to the second electrode strips 2. A minimum voltage in the incrementing bias voltages is 0 V, and a maximum voltage in the incrementing bias voltages is 0 V, 2 V, or 4 V. The voltage of 0 V is loaded to the second electrode strips 2. For example, FIG. 17 is a schematic diagram of beam scan in the drive mode shown in FIG. 16. FIG. 18 is a schematic diagram of radiation direction gain in the drive mode shown in FIG. 16. As shown in FIG. 17 and FIG. 18, for the case that the maximum voltage in the incrementing bias voltages is 0 V, 2 V, or 4 V, the meta-surface 00 is driven in the above drive mode, such that the beam scans in the first direction X, and the formed scan range of the beam is offset by +12° in the direction perpendicular to the normal of the meta-surface 00.

For the antenna 40 generating multi-beam, for example, the lens antenna 40, a plurality of feed sources are required near the focus to generate beams with different directions, such that the overall volume is increased, and the beam direction is fixed once formed. Thus, the meta-surface 00 in the embodiments of the present disclosure achieves the free switch between the multi-beam and the single-beam, each beam has a beam scan angle, and more coherent communication services are provided for users in high speed mobile state. Meanwhile, the insertion loss (S21) of each beam is less.

In a third aspect, the embodiments of the present disclosure further provide an electronic device. The electronic device includes the antenna according to any of the above embodiments. The electronic device is any product with communication functions, such as a mobile phone, a vehicle-mounted equipment, and the like. Persons of ordinary skill in the art shall understand other essential components of the electronic device, which are not repeated herein and are not intended to limit the present disclosure.

In some embodiments, the antenna in the electronic device further includes a transceiver unit, a radio frequency transceiver, a signal amplifier, a power amplifier, and a filter unit. The antenna in the communication device is a sending antenna or a receiving antenna. The transceiver unit includes a base band and a receiving terminal. The base band provides at least one frequency band signal, such as the 2G signal, the 3G signal, the 4G signal, the 5G signal, and the like, and sends at least one frequency band signal to the radio frequency transceiver. Upon receiving the signal, the antenna in the communication system transmits the signal to the receiving terminal of the transceiver unit upon processing by the filter unit, the power amplifier, the signal amplifier, and the radio frequency transceiver, and the receiving terminal is a smart gateway.

Furthermore, the radio frequency transceiver is connected to the transceiver unit for modulating the signal sent by the transceiver unit or demodulating the signal received by the antenna and transmitting the signal back to the transceiver unit. Specifically, the radio frequency transceiver includes a transmitting circuit, a receiving circuit, a modulation circuit, and a demodulation circuit. After the transmitting circuit receives various types of signals provided by the baseband, the modulation circuit modulates various types of signals provided by the baseband and then sends to the antenna. The antenna receives the signal and transmits to the receiving circuit of the radio frequency transceiver, the receiving circuit transmits the signal to the demodulation circuit, and the demodulation circuit demodulates the signal and then transmits to the receiving terminal.

Furthermore, the radio frequency transceiver is connected to the signal amplifier and the power amplifier, and the signal amplifier and the power amplifier are connected to the filter unit, and the filter unit is connected to at least one antenna. In sending signals by the communication system, the signal amplifier is used to improve the signal-to-noise ratio of the signals output by the radio frequency transceiver and then transmit to the filter unit. The power amplifier is used to amplify the power of the signal output by the radio frequency transceiver and then transmit to the filter unit. The filter unit specifically includes a duplexer and a filter circuit. The filter unit combines the signals output by the signal amplifier and the power amplifier, filters the noise wave and transmits to the antenna, and the antenna radiates the signal. In receiving signals by the communication system, the antenna transmits the signals to the filter unit upon receiving the signals, and the filter unit filters the noise wave from the signals received by the antenna and transmits to the signal amplifier and the power amplifier, and the signal amplifier gains the signals received by the antenna to increase the signal-to-noise ratio of the signals. The power amplifier amplifies the power of the signal received by the antenna. The signal received by the antenna is processed by the power amplifier and signal amplifier and transmits to the radio frequency transceiver, and the radio frequency transceiver then transmits to the transceiver unit.

In some embodiments, the signal amplifier includes various types of signal amplifiers, such as a low noise amplifier, which is not limited herein.

In some embodiments, the antenna in the embodiments of the present disclosure further includes a power management unit, and the power management unit is connected to the power amplifier to provide the voltage with amplified signal for the power amplifier.

It can be understood that the above embodiments are exemplary embodiments for illustrating the principles of the present disclosure, and should not be construed as limiting the present disclosure. A person of ordinary skill in the art can obtain variations and improvements without departing from the spirit or essence of the present disclosure, the variations and improvements are within the scope of the protection of the present disclosure.

The invention claimed is:

1. A meta-surface, comprising: a first substrate, a second substrate, and a tunable dielectric layer between the first substrate and the second substrate; wherein the first substrate comprises a first dielectric substrate and a first electrode layer on a side, close to the tunable dielectric layer, of the first dielectric substrate, and the second substrate comprises a second dielectric substrate and a second electrode layer on a side, close to the tunable dielectric layer, of the second dielectric substrate;

wherein the first electrode layer comprises a plurality of first electrode strips juxtaposed in a first direction, and the second electrode layer comprises a plurality of second electrode strips juxtaposed in a second direction, wherein the plurality of first electrode strips and the plurality of second electrode strips are crossed to define a plurality of resonant units; and the meta-surface further comprises a filling structure, wherein an orthographic projection of the filling structure on the first dielectric substrate is between orthographic projections of adjacent first electrode strips in the plurality of first electrode strips on the first dielectric substrate.

2. The meta-surface according to claim 1, wherein the first electrode layer comprises the filling structure between the adjacent first electrode strips.

3. The meta-surface according to claim 2, wherein the filling structure comprises a first filling strip and a second filling strip juxtaposed in the first direction, wherein a first gap is present between the first filling strip and the second filling strip; and for the adjacent first electrode strips and the filling structure between the adjacent first electrode strips, one of the adjacent first electrode strips and the first filling strip are connected to form an integral structure, and the other of the adjacent first electrode strips and the second filling strip are connected to form an integral structure.

4. The meta-surface according to claim 3, wherein a width of the first gap in the first direction is less than a width of each of the plurality of first electrode strips in the first direction.

5. The meta-surface according to claim 2, wherein a second gap is present between the filling structure and at least one adjacent first electrode strip in the plurality of first electrode strips.

6. The meta-surface according to claim 5, wherein a width of the second gap in the first direction is less than a width of each of the plurality of first electrode strips in the first direction.

7. The meta-surface according to claim 1, wherein each of the plurality of second electrode strips comprises a plurality of electrode portions and connection portions configured to connect two adjacent electrode portions in the plurality of electrode portions, wherein an orthographic projection of each of the plurality of electrode portions on the first dielectric substrate is overlapped with an orthographic projection of each of the plurality of first electrode strips on the first dielectric substrate.

8. The meta-surface according to claim 7, wherein a ratio of a width of the each of the plurality of electrode portions to a width of each of the connection portions in the second direction ranges from 2.57 to 2.58.

9. The meta-surface according to claim 1, wherein each of the plurality of resonant units further comprises a first via defined in each of the plurality of first electrode strips and a second via defined in each of the plurality of second electrode strips, wherein an orthographic projection of the first via on the first dielectric substrate is intersected with an orthographic projection of the second via on the first dielectric substrate.

10. The meta-surface according to claim 9, wherein a ratio of a width of the first via to a width of the each of the plurality of first electrode strips in the first direction ranges from 0.02 to 0.06, and a ratio of the width of the first via to a width of the each of the plurality of resonant units in the second direction ranges from 0.3 to 0.5.

11. The meta-surface according to claim 9, wherein a ratio of a width of the second via to a width of the each of the plurality of resonant units in the first direction ranges from 0.05 to 0.85, and a ratio of the width of the second via to the width of the each of the plurality of resonant units in the second direction ranges from 0.05 to 0.15.

12. An antenna module, comprising: at least one meta-surface and an antenna; wherein each of the at least one meta-surface comprises: a first substrate, a second substrate, and a tunable dielectric layer between the first substrate and the second substrate; wherein the first substrate comprises a first dielectric substrate and a first electrode layer on a side, close to the tunable dielectric layer, of the first dielectric substrate, and the second substrate comprises a second dielectric substrate and a second electrode layer on a side, close to the tunable dielectric layer, of the second dielectric substrate;

wherein the first electrode layer comprises a plurality of first electrode strips juxtaposed in a first direction, and the second electrode layer comprises a plurality of second electrode strips juxtaposed in a second direction, wherein the plurality of first electrode strips and the plurality of second electrode strips are crossed to define a plurality of resonant units; and the meta-surface further comprises a filling structure, wherein an orthographic projection of the filling structure on the first dielectric substrate is between orthographic projections of adjacent first electrode strips in the plurality of first electrode strips on the first dielectric substrate.

13. The antenna module according to claim 12, comprising: a plurality of meta-surfaces, the antenna is disposed in a region defined by the plurality of meta-surfaces, wherein the second electrode layer is closer to the antenna than the first electrode layer.

14. The antenna module according to claim 13, comprising: two opposite meta-surfaces in the plurality of meta-surfaces, wherein the antenna is disposed between the two opposite meta-surfaces.

15. The antenna module according to claim 14, wherein a distance between the antenna and each of the plurality of meta-surfaces ranges from 0.45 to 0.55 radiation wavelengths.

16. The antenna module according to claim 13, comprising: two of the plurality of meta-surfaces, wherein extension surfaces of the two of the plurality of meta-surfaces are intersected; and the antenna is disposed in a region defined by the two of the plurality of meta-surfaces.

17. The antenna module according to claim 13, comprising: the plurality of meta-surfaces sequentially connected to form an annular structure, wherein the antenna is disposed in the annular structure formed by the plurality of meta-surfaces.

18. The antenna module according to claim 12, wherein the antenna is a dipole antenna.

19. The antenna module according to claim 12, further comprising: a drive module, configured to sequential supply incrementing bias voltages to the plurality of first electrode strips in accordance with an arrangement sequence of the plurality of first electrode strips, such that a scanning range of a beam formed by the antenna module is offset by ±12° in a direction perpendicular to a normal of the meta-surface.

20. An electronic device, comprising: an antenna module, wherein the antenna module comprises: at least one meta-surface and an antenna; wherein each of the at least one meta-surface comprises: a first substrate, a second substrate, and a tunable dielectric layer between the first substrate and the second substrate; wherein the first substrate comprises a first dielectric substrate and a first electrode layer on a side, close to the tunable dielectric layer, of the first dielectric substrate, and the second substrate comprises a second dielectric substrate and a second electrode layer on a side, close to the tunable dielectric layer, of the second dielectric substrate;

wherein the first electrode layer comprises a plurality of first electrode strips juxtaposed in a first direction, and the second electrode layer comprises a plurality of second electrode strips juxtaposed in a second direction, wherein the plurality of first electrode strips and the plurality of second electrode strips are crossed to define a plurality of resonant units; and the meta-surface further comprises a filling structure, wherein an orthographic projection of the filling structure on the first dielectric substrate is between orthographic projections of adjacent first electrode strips in the plurality of first electrode strips on the first dielectric substrate.

* * * * *